United States Patent
Kajiwara

(10) Patent No.: US 9,834,159 B2
(45) Date of Patent: Dec. 5, 2017

(54) CONTROL SYSTEM AND SEMICONDUCTOR DEVICE

(71) Applicant: Renesas Electronics Corporation, Kawasaki-shi (JP)

(72) Inventor: Yuki Kajiwara, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 38 days.

(21) Appl. No.: 14/792,365

(22) Filed: Jul. 6, 2015

(65) Prior Publication Data
US 2016/0023663 A1    Jan. 28, 2016

(30) Foreign Application Priority Data
Jul. 28, 2014    (JP) ................. 2014-152815

(51) Int. Cl.
G06F 7/00 (2006.01)
B60R 16/023 (2006.01)
G05D 1/02 (2006.01)

(52) U.S. Cl.
CPC ....... B60R 16/0231 (2013.01); G05D 1/0246 (2013.01); G05D 1/0242 (2013.01); G05D 1/0257 (2013.01)

(58) Field of Classification Search
CPC .......... B60W 2510/087; B60W 10/08; B60W 10/184; B60W 10/188; B60W 2510/182; B60W 2520/06; B60W 2710/083; B60W 30/18109; B60W 30/1843; B60W 30/18118; B60W 2710/06; B60W 10/04; B60W 20/13; B60W 50/10; B60W 2550/10; G06F 12/0246; G06F 12/1408; G06F 11/2069; G06F 13/18; G05D 2201/0213; G05D 1/0257; G05D 1/0246; G05D 1/0287
USPC ....... 701/36, 22, 112, 41, 42, 113, 115, 301, 701/23
See application file for complete search history.

(56) References Cited

U.S. PATENT DOCUMENTS 7,120,507 B2 * 10/2006 Tanaka ................. B60W 50/04
                                                                   455/100
8,255,109 B2 *  8/2012 Isoyama ........... H04L 12/40006
                                                                   701/29.1
8,498,795 B2 *  7/2013 Eriksson ............... B60W 10/08
                                                                   123/236

(Continued)

FOREIGN PATENT DOCUMENTS

JP     2009-217692 A     9/2009

Primary Examiner — Jelani Smith
Assistant Examiner — Luis A Martinez Borrero
(74) Attorney, Agent, or Firm — McGinn IP Law Group, PLLC

(57) ABSTRACT

An object of the present invention is to control a vehicle with less delay. A control system 100 according to the present invention includes: an estimating unit 103 that estimates a factor and a required time until encountering the factor based on a result of an observation of a periphery of a vehicle; and a deciding unit 104 that decides control contents of the vehicle based on data stored in a first storage unit 101 when the required time is longer than a threshold and that decides control contents of the vehicle based on data stored in a second storage unit 102 which can be accessed at a higher speed than the first storage unit 101 when the required time is equal to or shorter than the threshold.

23 Claims, 22 Drawing Sheets

(56) References Cited

U.S. PATENT DOCUMENTS

| | | | | |
|---|---|---|---|---|
| 9,313,241 | B2* | 4/2016 | Wang | H04L 65/4061 |
| 2003/0033067 | A1* | 2/2003 | Arita | B60R 16/0315 |
| | | | | 701/48 |
| 2004/0010322 | A1* | 1/2004 | Tanaka | B60W 50/04 |
| | | | | 700/2 |
| 2004/0105292 | A1* | 6/2004 | Matsui | G06F 13/4243 |
| | | | | 365/63 |
| 2006/0184740 | A1* | 8/2006 | Ishikawa | G06F 12/084 |
| | | | | 711/129 |
| 2006/0273236 | A1* | 12/2006 | Gutbrod | H05B 33/0803 |
| | | | | 250/205 |
| 2007/0016337 | A1* | 1/2007 | Iwagami | B60R 16/03 |
| | | | | 701/1 |
| 2008/0201341 | A1* | 8/2008 | Okamoto | H04N 21/2312 |
| 2009/0118903 | A1* | 5/2009 | Kimura | G07C 5/008 |
| | | | | 701/36 |
| 2009/0157602 | A1* | 6/2009 | Suga | H04N 1/00832 |
| 2010/0146277 | A1* | 6/2010 | Mochizuki | H04L 63/0428 |
| | | | | 713/169 |
| 2010/0191899 | A1* | 7/2010 | Kurashige | G06F 9/4411 |
| | | | | 711/103 |
| 2010/0231354 | A1* | 9/2010 | Nishiguchi | H04L 63/08 |
| | | | | 340/5.8 |
| 2011/0105017 | A1* | 5/2011 | Takada | H04L 12/40013 |
| | | | | 455/18 |
| 2011/0304447 | A1* | 12/2011 | Marumoto | G07C 5/085 |
| | | | | 340/438 |
| 2012/0101656 | A1* | 4/2012 | Nito | B60R 25/20 |
| | | | | 701/1 |
| 2012/0110296 | A1* | 5/2012 | Harata | G06F 12/06 |
| | | | | 711/203 |
| 2012/0161833 | A1* | 6/2012 | Yoshida | G06F 15/78 |
| | | | | 327/156 |
| 2013/0090804 | A1* | 4/2013 | Oda | B60W 50/04 |
| | | | | 701/32.3 |
| 2013/0100750 | A1* | 4/2013 | Ishiguro | H03K 19/1776 |
| | | | | 365/189.011 |
| 2013/0272050 | A1* | 10/2013 | Otsuka | G11C 17/16 |
| | | | | 365/96 |
| 2014/0111932 | A1* | 4/2014 | Fukuda | G11B 33/128 |
| | | | | 361/679.33 |
| 2014/0297109 | A1* | 10/2014 | Shimomura | H04L 69/40 |
| | | | | 701/36 |
| 2015/0006796 | A1* | 1/2015 | Takeuchi | G06F 12/0246 |
| | | | | 711/103 |
| 2015/0088382 | A1* | 3/2015 | Obuchi | B60K 31/00 |
| | | | | 701/41 |
| 2015/0236696 | A1* | 8/2015 | Saen | H03K 19/0075 |
| | | | | 326/10 |
| 2016/0011788 | A1* | 1/2016 | Tsuchiya | G06F 3/0608 |
| | | | | 711/154 |
| 2016/0011805 | A1* | 1/2016 | Nakagawa | G06F 3/0619 |
| | | | | 711/114 |
| 2016/0034226 | A1* | 2/2016 | Nakaso | G06F 11/1441 |
| | | | | 714/6.11 |
| 2016/0182620 | A1* | 6/2016 | Ukai | H04L 67/1004 |
| | | | | 709/203 |
| 2016/0299839 | A1* | 10/2016 | Biewer | G06F 12/08 |
| 2016/0371192 | A1* | 12/2016 | Lin | G06F 12/0886 |
| 2017/0010349 | A1* | 1/2017 | Kajiwara | G01S 7/04 |
| 2017/0017555 | A1* | 1/2017 | Kitsunai | G06F 11/1471 |
| 2017/0090820 | A1* | 3/2017 | Maspoli | G06F 3/0611 |

* cited by examiner

| ID | TIME UNTIL FACING SITUATION | FACTOR | PRIORITY | ACTION |
|---|---|---|---|---|
| 1 | 3 SECONDS | PEDESTRIAN | 10 | STOP (SUDDEN) |
| 2 | 5 SECONDS | PEDESTRIAN | 10 | STOP (NORMAL) |
| 3 | 7 SECONDS | PEDESTRIAN | 10 | STOP (SLOW) |
| 4 | 3 SECONDS | PEDESTRIAN | 6 | DETOUR (SUDDEN) |
| 5 | 3 SECONDS | PEDESTRIAN | 6 | DETOUR (SUDDEN) |
| 6 | 5 SECONDS | PEDESTRIAN | 6 | DETOUR (NORMAL) |
| 7 | 5 SECONDS | PEDESTRIAN | 6 | DETOUR (NORMAL) |
| 8 | 7 SECONDS | PEDESTRIAN | 6 | DETOUR (SLOW) |
| 9 | 7 SECONDS | PEDESTRIAN | 6 | DETOUR (SLOW) |
| 10 | 3 SECONDS | INSTALLATION | 6 | DETOUR (SUDDEN) |
| 11 | 5 SECONDS | INSTALLATION | 6 | DETOUR (NORMAL) |
| 12 | 7 SECONDS | INSTALLATION | 6 | DETOUR (SLOW) |
| 13 | 5 SECONDS | DIFFERENCE IN LEVEL | 6 | DETOUR (NORMAL) |
| 14 | 5 SECONDS | DIFFERENCE IN LEVEL | 2 | DECELERATE |
| ⋮ | ⋮ | ⋮ | ⋮ | ⋮ |

Fig. 3

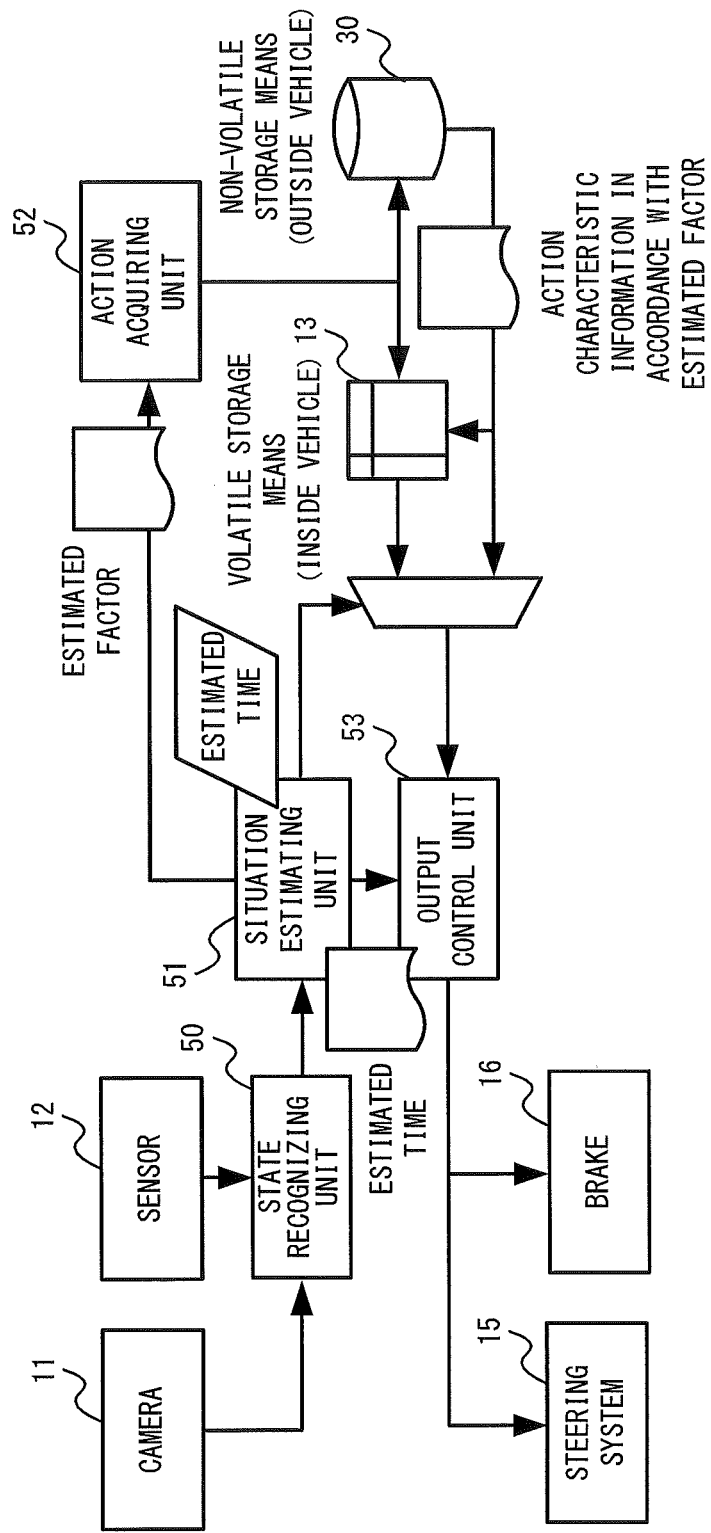

Fig. 7

| ID | TIME UNTIL FACING SITUATION | FACTOR | PRIORITY | ACTION | RESULT |
|---|---|---|---|---|---|
| 1 | 3 SECONDS | PEDESTRIAN | 11 | STOP (SUDDEN) | 20 |
| 2 | 5 SECONDS | PEDESTRIAN | 9 | STOP (NORMAL) | 15 |
| 3 | 7 SECONDS | PEDESTRIAN | 7 | STOP (SLOW) | 13 |
| 4 | 3 SECONDS | PEDESTRIAN | 10 | DETOUR (SUDDEN) | 18 |
| 5 | 3 SECONDS | PEDESTRIAN | 10 | DETOUR (SUDDEN) | 2 |
| 6 | 5 SECONDS | PEDESTRIAN | 8 | DETOUR (NORMAL) | 3 |
| 7 | 5 SECONDS | PEDESTRIAN | 8 | DETOUR (NORMAL) | 17 |
| 8 | 7 SECONDS | PEDESTRIAN | 3 | DETOUR (SLOW) | 4 |
| 9 | 7 SECONDS | PEDESTRIAN | 3 | DETOUR (SLOW) | 21 |
| 10 | 3 SECONDS | INSTALLATION | 5 | DETOUR (SUDDEN) | 17 |
| 11 | 5 SECONDS | INSTALLATION | 4 | DETOUR (NORMAL) | 15 |
| 12 | 7 SECONDS | INSTALLATION | 3 | DETOUR (SLOW) | 19 |
| 13 | 5 SECONDS | DIFFERENCE IN LEVEL | 4 | DETOUR (NORMAL) | 16 |
| 14 | 5 SECONDS | DIFFERENCE IN LEVEL | 1 | DECELERATE | 16 |
| ... | ... | ... | ... | ... | ... |

US 9,834,159 B2

CONTROL SYSTEM AND SEMICONDUCTOR DEVICE

CROSS-REFERENCE TO RELATED APPLICATIONS

This application is based upon and claims the benefit of priority from Japanese patent application No. 2014-152815, filed on Jul. 28, 2014, the disclosure of which is incorporated herein in its entirety by reference.

BACKGROUND

The present invention relates to a control system and a semiconductor device and relates to, for example, a technique for controlling a vehicle.

Japanese Unexamined Patent Application Publication No. 2009-217692 discloses a driving assistance device intended to perform accurate risk determination and output warning information. The driving assistance device recognizes various states such as positions and movement states of peripheral objects based on output from various sensors. In addition, the driving assistance device estimates a collision risk between a host vehicle and a peripheral object based on an equation of motion that is designed for each object type. Then, based on the various recognized states and the estimated collision risk, the driving assistance device estimates a risk factor that may occur in a current situation using a risk factor estimation table. The driving assistance device then displays warning information including a finally estimated risk factor and a collision risk. Accordingly, by notifying a driver of a risk factor and the like, the driving assistance device can cause the driver to avoid colliding with peripheral objects in an appropriate manner.

SUMMARY

When some factor occurs with respect to a vehicle, the driving assistance device disclosed in Japanese Unexamined Patent Application Publication No. 2009-217692 is capable of controlling the vehicle in accordance with the factor. However, usefulness of the driving assistance device can be improved if the driving assistance device is able to control a vehicle without delay in accordance with a factor that occurs with respect to the vehicle.

Other objects and novel features will become apparent with reference to the following description and to the accompanying drawings.

According to an embodiment, a control system decides control contents of a vehicle based on data stored in a first storage unit when a required time until encountering a factor is longer than a threshold, and decides the control contents of the vehicle based on data stored in a second storage unit, which can be accessed at a higher speed than the first storage unit, when the required time is equal to or shorter than the threshold.

According to the embodiment described above, a vehicle can be controlled with less delay.

BRIEF DESCRIPTION OF THE DRAWINGS

The above and other aspects, advantages and features will be more apparent from the following description of certain embodiments taken in conjunction with the accompanying drawings, in which:

FIG. 3 is a diagram showing an example of data according to the first embodiment;

FIG. 4 is a functional block diagram of the vehicle control system according to the first embodiment;

FIG. 7 is a diagram showing an example of data according to a third embodiment;

DETAILED DESCRIPTION

Figure 1:
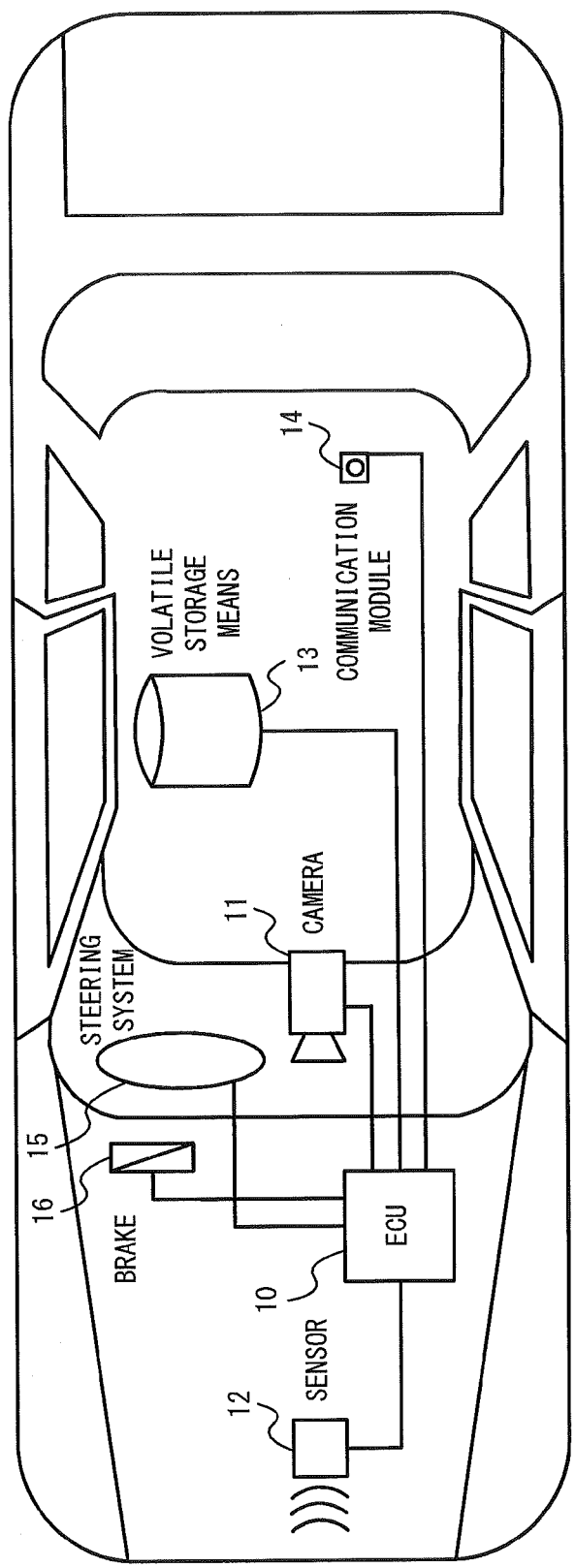
FIG. 1 is a configuration diagram of a vehicle-mounted control system according to a first embodiment.

Hereinafter, preferred embodiments of the present invention will be described with reference to the drawings. It should be noted that specific numerical values and the like that are presented in the following embodiments are simply examples intended to facilitate understanding of the invention and that the present invention is not limited thereto unless otherwise stated. It should also be noted that, in the following description and in the drawings, matters obvious to a person skilled in the art are omitted or simplified as appropriate for clarity in the description.

First Embodiment

First, a first embodiment will be described. A configuration of a vehicle-mounted control system 1 according to the present first embodiment will now be described with reference to FIG. 1. As shown in FIG. 1, the vehicle-mounted control system 1 includes an electronic control unit (ECU) 10, a camera 11, a sensor 12, volatile storage means 13, a communication module 14, a steering system 15, and a brake 16. The vehicle-mounted control system 1 is a system that is mounted to an automobile. Hereinafter, an automobile (vehicle) to which the vehicle-mounted control system 1 is mounted will also be referred to as a "host vehicle".

The ECU 10 controls various units (the steering system, the brake, and the like) of the host vehicle. In this case, the ECU 10 has a manual control mode in which the host vehicle is controlled based on an operation performed by a driver and an automatic control mode in which the host vehicle is automatically controlled independently of an operation performed by the driver. In the automatic control mode, based on information obtained from the camera 11 and the sensor 12, the ECU 10 performs recognition of a state which the host vehicle is in, a determination of control contents of the host vehicle in accordance with the state, and control of the host vehicle.

The camera 11 is a device for capturing images of a periphery of the host vehicle. By capturing an image of the periphery of the host vehicle, the camera 11 generates image information indicating the image of the periphery of the host vehicle and transmits the image information to the ECU 10. In the present first embodiment, an example in which the camera 11 captures an image within a prescribed angle range to the front of the host vehicle will be described. In other words, as shown in FIG. 1, the camera 11 is installed in the host vehicle so as to face the front of the host vehicle.

The sensor 12 is a device for measuring a distance from the host vehicle to a peripheral object. For example, the sensor 12 measures a distance from the host vehicle to a peripheral object using electromagnetic waves such as light waves (for example, including infrared light) and radio waves (for example, including millimeter waves). The sensor 12 generates distance information indicating a measured distance to the peripheral object and transmits the distance information to the ECU 10. In the present first embodiment, an example in which the sensor 12 measures a distance to an object present to the front of the host vehicle will be described. In other words, as shown in FIG. 1, the sensor 12 is installed in the host vehicle so as to face the front of the host vehicle.

Information used by the ECU 10 to execute processes and a program including instructions that cause the ECU 10 to execute the processes are stored in the volatile storage means 13. By executing the program stored in the volatile storage means 13, the ECU 10 realizes the processes according to the present first embodiment. The volatile storage means 13 is volatile storage means for retaining information while an ignition power supply of the host vehicle is switched on and power is being supplied and which loses retained information when the ignition power supply of the host vehicle is switched off and power is no longer supplied. The volatile storage means 13 is configured so as to include, for example, at least one volatile memory. Moreover, action characteristic information which is used to control the host vehicle and which is one of the types of information stored in the volatile storage means 13 will be described later.

The communication module 14 transmits information transmitted from the ECU 10 to outside of the vehicle-mounted control system 1 using a radio signal. In addition, the communication module 14 receives a radio signal from the outside of the vehicle-mounted control system 1 and transmits information indicated by the radio signal to the ECU 10. A signal based on an arbitrary radio communication standard may be used as the radio signal. For example, a signal based on mobile communication may be used as the radio signal.

The steering system 15 changes a steering angle of tires of the host vehicle in accordance with an instruction from the ECU 10. An effectiveness of the brake 16 is adjusted in accordance with an instruction from the ECU 10.

Figure 2:
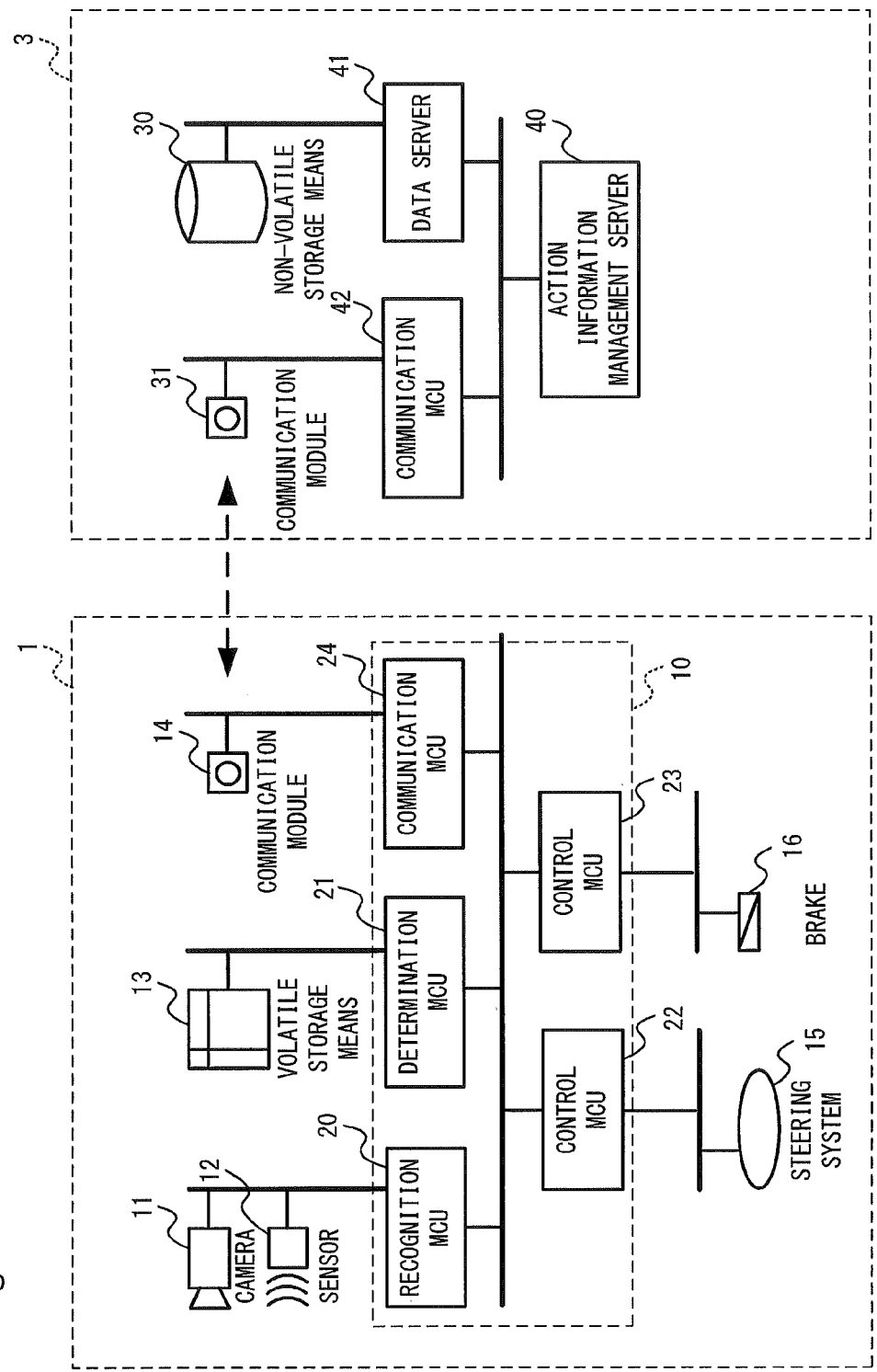
FIG. 2 is a configuration diagram of a vehicle control system according to the first embodiment.

Next, a configuration of a vehicle control system 2 according to the first embodiment will be described with reference to FIG. 2. As shown in FIG. 2, the vehicle control system 2 includes the vehicle-mounted control system 1 and a data management system 3. While the vehicle-mounted control system 1 includes the respective devices 10 to 16 described above, FIG. 2 further shows a configuration of the ECU 10 in greater detail.

The ECU 10 includes a recognition micro control unit (MCU) 20, a determination MCU 21, control MCUs 22 and 23, and a communication MCU 24. The respective MCUs 20 to 24 are connected to one another via a bus to be capable of transmitting and receiving information to and from one another. In addition, the respective MCUs 20 to 24 are connected to the respective devices 10 to 16 via a dedicated bus.

The recognition MCU 20 recognizes a state of the host vehicle based on image information received from the camera 11 and distance information received from the sensor 12. More specifically, for example, the recognition MCU 20 recognizes an object present in a periphery of the host vehicle as a state of the host vehicle. For example, with respect to an object present in the periphery of the host vehicle, the recognition MCU 20 recognizes a position thereof, whether or not the object is traveling, a travel direction and a travel speed thereof, and the like. In addition, the recognition MCU 20 transmits recognition result information indicating a recognized state to the determination MCU 21.

The determination MCU 21 estimates a factor that occurs with respect to the host vehicle based on recognition result information received from the recognition MCU 20. A factor that occurs with respect to the host vehicle represents a presence of an object (a pedestrian, an obstacle, and the like) for which a necessity of evasion by the host vehicle may arise. Hereinafter, a factor estimated by the determination MCU 21 will also be referred to as an "estimated factor". In addition, the determination MCU 21 calculates a time until the host vehicle faces a situation where an origin (object) of the factor is reached when a decision is made to continue traveling. Hereinafter, a time calculated by the determination MCU 21 will also be referred to as an "estimated time". The determination MCU 21 performs control to retrieve, from the volatile storage means 13, action characteristic information indicating an action to be taken by the host vehicle with respect to an estimated factor in consideration of an estimated time. While action characteristic information is stored in plurality in the volatile storage means 13 in this manner, the action characteristic information will be described later. Typically, the determination MCU 21 includes the volatile storage means 13.

The control MCUs 22 and 23 select action characteristic information indicating action that is favorably taken by the host vehicle with respect to an estimated factor according to prescribed criteria from action characteristic information obtained by the control performed by the determination MCU 21. The control MCUs 22 and 23 control the host vehicle based on the selected action characteristic information. Accordingly, control based on the action characteristic information is performed on at least one of the steering system 15 and the brake 16.

The communication MCU 24 transmits and receives information to and from the data management system 3 via the communication module 14. Typically, the communication MCU 24 includes the communication module 14. The communication MCU 24 transmits information received from the other MCUs 20 to 23 to the data management system 3 via the communication module 14. The communication MCU 24 transmits information received from the data management system 3 via the communication module 14 to the other MCUs 20 to 23.

The data management system 3 includes non-volatile storage means 30, a communication module 31, an action information management server 40, a data server 41, and a communication MCU 42.

The non-volatile storage means 30 stores a plurality of pieces of action characteristic information. The non-volatile storage means 30 is non-volatile storage means capable of retaining information regardless of whether power is being supplied or not. For example, the non-volatile storage means 30 is configured so as to include at least one non-volatile memory or at least one hard disk, or a combination thereof.

The communication module 31 transmits information from the communication MCU 42 to outside of the data management system 3 using a radio signal. In addition, the communication module 31 receives a radio signal from the outside of the data management system 3 and transmits information indicated by the radio signal to the communication MCU 42. As the radio signal, a signal based on an arbitrary radio communication standard may be used in a similar manner as the radio signal described earlier.

The action information management server 40 is an information processing device that manages action characteristic information. In this case, when retrieving action characteristic information from the non-volatile storage means 30, the determination MCU 21 transmits request information for requesting retrieval of action characteristic information to the data management system 3 via the communication module 14. The action information management server 40 receives the request information transmitted from the determination MCU 21 via the communication module 31. The action information management server 40 transmits instruction information for instructing retrieval of action characteristic information to the data server 41 in accordance with the request information. The action information management server 40 transmits the action characteristic information obtained by retrieval performed by the data server 41 to the vehicle-mounted control system 1 via the communication module 31.

The data server 41 is an information processing device that retains information used by the vehicle-mounted control system 1. In other words, the data server 41 includes the non-volatile storage means 30. The data server 41 retrieves desired action characteristic information and provides the action information management server 40 with the action characteristic information in accordance with instruction information from the action information management server 40.

The communication MCU 42 transmits and receives information to and from the vehicle-mounted control system 1 via the communication module 31. Typically, the communication MCU 42 includes the communication module 31. The communication MCU 42 transmits information received from the action information management server 40 and the data server 41 to the vehicle-mounted control system 1 via the communication module 31. The communication MCU 42 transmits information received from the vehicle-mounted control system 1 via the communication module 31 to the action information management server 40 and the data server 41.

For example, when radio signals transmitted and received between the communication module 14 and the communication module 31 are based on mobile communication, typically, a base station includes the communication MCU 42 and the communication module 31. In this case, the base station, the action information management server 40, and the data server 41 are connected to one another via a network (for example, a mobile communication network or the Internet) to be capable of transmitting and receiving information to and from one another.

As described above, when transmitting and receiving information between the respective MCUs 20 to 23 in the vehicle-mounted control system 1 and the respective servers 40 and 41 in the data management system 3, information is transmitted and received via the communication MCU 24, the communication module 14, the communication module 31, and the communication MCU 42.

Next, an example of data stored in the volatile storage means 13 and the non-volatile storage means 30 will be described with reference to FIG. 3. As illustrated in FIG. 3, in addition to an "action" that corresponds to action characteristic information described earlier, data stored in the volatile storage means 13 and the non-volatile storage means 30 includes information indicating an "ID", a "time until facing situation", a "factor", and a "priority" as associated information.

An "ID" is information that uniquely identifies data. While an example will be described in which an "ID" is expressed by an integer in the present first embodiment, an "ID" is not limited to an integer. For example, an "ID" may be expressed by a numerical value other than an integer.

A "time until facing situation" is a time until the host vehicle reaches an origin of a "factor" when the host vehicle continues traveling.

A "factor" represents a factor that occurs with respect to the host vehicle (a presence of an object for which a necessity of evasion by the host vehicle may arise). Examples of an origin (object) of a "factor" include a pedestrian and obstacles other than a pedestrian (such as a utility pole, a pole, a tree, a fence, a difference in level, and an automobile).

A "priority" represents a degree to which an "action" is to be preferentially selected with respect to a "factor". By selecting an "action" with a higher "priority" with respect to the same "factor", an origin of the "factor" can be evaded even in a state that is assumed by an "action" with a lower "priority". In other words, a "priority" corresponds to a degree of evading the origin of the "factor". Therefore, an "action" with a higher "priority" is preferentially selected as an action to be taken with respect to an estimated factor. For example, the "priority" of an "action" representing control contents involving stopping before reaching the origin of the "factor" (a "stop" to be described later) is set higher than that of an "action" representing control contents involving detouring the origin of the "factor" and continuing traveling by changing a travel route of the host vehicle before reaching the origin of the "factor" (a "detour" to be described later).

Moreover, while an example will be described in which a "priority" is expressed by an integer in the present first embodiment, a "priority" is not limited to an integer. For example, a "priority" may be expressed by a numerical value other than an integer. In addition, while an example will be described in which a higher "priority" is expressed by a greater numerical value, a "priority" is not limited to this example. For example, a higher "priority" may be expressed by a smaller numerical value. For example, a "priority" is set using at least one of the criteria described below.

(1) When an origin of a "factor" is an object capable of travel (for example, a pedestrian and an automobile), a "priority" of an "action" that assumes a traveling object is set higher than a "priority" of an "action" that assumes an object that is not traveling.

(2) When an origin of a "factor" is an object capable of travel, a "priority" of an "action" that assumes an object traveling toward the host vehicle is set higher than a "priority" of an "action" that assumes an object traveling away from the host vehicle.

(3) When an origin of a "factor" is a difference in level, a "priority" of a difference in level which cannot be negotiated by the host vehicle is set higher than a "priority" of a difference in level which can be negotiated by the host vehicle.

(4) When an origin of a "factor" is a pedestrian, a "priority" of an "action" which assumes that the pedestrian is a child is set higher than a "priority" of an "action" which assumes that the pedestrian is an adult.

An "action" represents control contents to be taken by the host vehicle with respect to a "factor". By controlling the host vehicle according to the control contents represented by an "action", the host vehicle can be controlled so that the host vehicle evades an origin of the "factor" before a "time until facing situation". In other words, an "action" represents control contents that can be executed and completed before the "time until facing situation" lapses.

Next, respective pieces of data shown in FIG. 3 will be described. The data with an "ID" of "1" assumes a case where a "pedestrian" is present as an origin of a "factor" at a point when the host vehicle reaches a location which can be reached in "3 seconds" that is the "time until facing situation". In addition, the data assumes a case where the "pedestrian" that is the origin of the "factor" is traveling in a direction approaching the host vehicle. Therefore, as an "action", the data indicates a "stop (sudden)" with control contents involving stopping the host vehicle before reaching the "pedestrian" by stopping the host vehicle before "3 seconds" lapse. A "priority" is set to 10.

The data with an "ID" of "2" assumes a case where a "pedestrian" is present as an origin of a "factor" at a point when the host vehicle reaches a location which can be reached in "5 seconds" that is the "time until facing situation". In addition, the data assumes a case where the "pedestrian" that is the origin of the "factor" is traveling in a direction approaching the host vehicle. Therefore, as an "action", the data indicates a "stop (normal)" with control contents involving stopping the host vehicle before "5 seconds" lapse. In other words, a "stop (normal)" represents control contents involving stopping the host vehicle before reaching the "pedestrian" by stopping the host vehicle more gradually than the "stop (sudden)" described above. Since the data assumes a case where a "pedestrian" is traveling in a direction approaching the host vehicle in a similar manner to the data with an "ID" of "1", a "priority" of "10" is similarly set.

The data with an "ID" of "3" assumes a case where a "pedestrian" is present as an origin of a "factor" at a point when the host vehicle reaches a location which can be reached in "7 seconds" that is the "time until facing situation". In addition, the data assumes a case where the "pedestrian" that is the origin of the "factor" is traveling in a direction approaching the host vehicle. Therefore, as an "action", the data indicates a "stop (slow)" with control contents involving stopping the host vehicle before reaching the "pedestrian" by stopping the host vehicle before "7 seconds" lapse. In other words, a "stop (slow)" represents control contents involving stopping the host vehicle more gradually than the "stop (normal)" described above. Since the data assumes a case where a "pedestrian" is traveling in a direction approaching the host vehicle in a similar manner to the data with an "ID" of "1", a "priority" of "10" is similarly set.

The data with an "ID" of "4" assumes a case where a "pedestrian" is present as an origin of a "factor" at a point when the host vehicle reaches a location which can be reached in "3 seconds" that is the "time until facing situation". In addition, the data assumes a case where the "pedestrian" that is the origin of the "factor" is not traveling. Therefore, as an "action", the data indicates a "detour (sudden)" with control contents involving detouring the "pedestrian" and continuing traveling by changing a travel route of the host vehicle before "3 seconds" lapse. Since the data assumes a case where a "pedestrian" is not traveling which differs from a case where the "pedestrian" is traveling as in the case of the data with an "ID" of "1", a "priority" of "6" that is lower than the "priority" of "10" in the case of the data with an "ID" of "1" is set.

The data with an "ID" of "5" assumes a similar situation as the data with an "ID" of "4". Therefore, a "time until facing situation" is "3 seconds", an origin of a "factor" is a "pedestrian", a "priority" is "6", and an "action" is "detour (sudden)". However, strictly speaking, there is a slight difference in the control contents of the host vehicle that are represented by the "action". Obviously, the "action" generally represents control contents involving detouring the "pedestrian" and continuing traveling by changing a travel route of the host vehicle before "3 seconds" lapse. In this manner, options may be provided even with respect to the same situation.

The data with an "ID" of "6" assumes a case where a "pedestrian" is present as an origin of a "factor" at a point when the host vehicle reaches a location which can be reached in "5 seconds" that is the "time until facing situation". In addition, the data assumes a case where the "pedestrian" that is the origin of the "factor" is not traveling. Therefore, as an "action", the data indicates a "detour (normal)" with control contents involving detouring the "pedestrian" and continuing traveling by changing a travel route of the host vehicle before "5 seconds" lapse. In other words, the "detour (normal)" represents control contents involving changing the travel route of the host vehicle more gradually than the "detour (sudden)" described above. Since the data assumes a case where a "pedestrian" is not traveling in a similar manner to the data with an "ID" of "4", a "priority" of "6" is similarly set.

The data with an "ID" of "7" assumes a similar situation as the data with an "ID" of "6". Therefore, a "time until facing situation" is "5 seconds", an origin of a "factor" is a "pedestrian", a "priority" is "6", and an "action" is "detour (normal)". However, strictly speaking, there is a slight difference in the control contents of the host vehicle that are represented by the "action". Obviously, the "action" generally represents control contents involving detouring the "pedestrian" and continuing traveling by changing a travel route of the host vehicle before "7 seconds" lapse. This is similar in intent to the data with an "ID" of "5".

The data with an "ID" of "8" assumes a case where a "pedestrian" is present as an origin of a "factor" at a point when the host vehicle reaches a location which can be reached in "7 seconds" that is the "time until facing situation". In addition, the data assumes a case where the "pedestrian" that is the origin of the "factor" is not traveling. Therefore, as an "action", the data indicates a "detour (slow)" with control contents involving detouring the "pedestrian" and continuing traveling by changing a travel route of the host vehicle before "7 seconds" lapse. In other words, the "detour (slow)" represents control contents involving changing the travel route of the host vehicle more gradually than the "detour (normal)" described above. Since the data assumes a case where a "pedestrian" is not traveling in a similar manner to the data with an "ID" of "4", a "priority" of "6" is similarly set.

The data with an "ID" of "9" assumes a similar situation as the data with an "ID" of "8". Therefore, a "time until facing situation" is "7 seconds", an origin of a "factor" is a "pedestrian", a "priority" is "6", and an "action" is "detour (slow)". However, strictly speaking, there is a slight difference in the control contents of the host vehicle that are represented by the "action". Obviously, the "action" generally represents control contents involving detouring the "pedestrian" and continuing traveling by changing a travel route of the host vehicle before "7 seconds" lapse. This is similar in intent to the data with an "ID" of "5".

The data with an "ID" of "10" assumes a case where an "installation" is present as an origin of a "factor" at a point when the host vehicle reaches a location which can be reached in "3 seconds" that is the "time until facing situation". An "installation" refers to an object that is incapable of traveling among obstacles. Therefore, as an "action", the data indicates a "detour (sudden)" with control contents involving detouring the "installation" and continuing traveling by changing a travel route of the host vehicle before "3 seconds" lapse. A "priority" is set to 6.

The data with an "ID" of "11" assumes a case where an "installation" is present as an origin of a "factor" at a point when the host vehicle reaches a location which can be reached in "5 seconds" that is the "time until facing situation". Therefore, as an "action", a "detour (normal)" is set which involves detouring the "installation" and continuing traveling by changing a travel route of the host vehicle before "5 seconds" lapse. Since the data assumes an "installation" in a similar manner to the data with an "ID" of "10", a "priority" of "6" is similarly set.

The data with an "ID" of "12" assumes a case where an "installation" is present as an origin of a "factor" at a point when the host vehicle reaches a location which can be reached in "10 seconds" that is the "time until facing situation". Therefore, as an "action", a "detour (slow)" is set which involves detouring the "installation" and continuing traveling by changing a travel route of the host vehicle before "7 seconds" lapse. Since the data assumes an "installation" in a similar manner to the data with an "ID" of "10", a "priority" of "6" is similarly set.

The data with an "ID" of "13" assumes a case where a "difference in level" is present as an origin of a "factor" at a point when the host vehicle reaches a location which can be reached in "5 seconds" that is the "time until facing situation". In addition, the data assumes a case where the "difference in level" that is the origin of the "factor" has a height that cannot be negotiated by the host vehicle. Therefore, as an "action", the data indicates a "detour (normal)" which involves detouring the "difference in level" and continuing traveling by changing a travel route of the host vehicle before "5 seconds" lapse. A "priority" is set to 6.

The data with an "ID" of "14" assumes a case where a "difference in level" is present as an origin of a "factor" at a point when the host vehicle reaches a location which can be reached in "5 seconds" that is the "time until facing situation". In addition, the data assumes a case where the "difference in level" that is the origin of the "factor" has a height that can be negotiated by the host vehicle. Therefore, as an "action", the data indicates a "deceleration" with control contents involving decelerating the host vehicle and continuing traveling before "5 seconds" lapse. Since the data assumes a case where a "difference in level" has a height that can be negotiated by the host vehicle which differs from a case where the "difference in level" has a height that cannot be negotiated by the host vehicle as in the case of the data with an "ID" of "13", a "priority" of "2" that is lower than the "priority" of "6" in the case of the data with an "ID" of "13" is set.

Hereinafter, in the present first embodiment, a description will be given on the assumption that the plurality of pieces of data shown in FIG. 3 are stored in advance in the non-volatile storage means 30. In this case, the volatile storage means 13 and the non-volatile storage means 30 respectively store a plurality of pieces of data. Compared to the non-volatile storage means 30, the volatile storage means 13 enables data to be accessed from the ECU 10 at a higher speed but the number of pieces of data that can be retained is smaller. On the other hand, compared to the volatile storage means 13, data in the non-volatile storage means 30 can only be accessed by the ECU 10 at a lower speed but the non-volatile storage means 30 is capable of retaining a greater number of pieces of data. In other words, a capacity of the volatile storage means 13 is too small to store all of the data that is stored in the non-volatile storage means 30. Therefore, several pieces of data among the plurality of pieces of data stored in the non-volatile storage means 30 are to be selectively stored in the volatile storage means 13.

Next, functional blocks of the vehicle control system 2 according to the first embodiment will be described with reference to FIG. 4. As shown in FIG. 4, the vehicle control system 2 according to the first embodiment includes a state recognizing unit 50, a situation estimating unit 51, an action acquiring unit 52, and an output control unit 53.

The state recognizing unit 50 recognizes a state which the host vehicle is in based on image information received from the camera 11 and distance information received from the sensor 12. In other words, the state recognizing unit 50 recognizes objects present in a periphery of the host vehicle as described earlier. For example, the recognition MCU 20 functions as the state recognizing unit 50.

The situation estimating unit 51 calculates the estimated factor described earlier based on the state which the host vehicle is in as recognized by the state recognizing unit 50. In addition, the situation estimating unit 51 calculates the estimated time described earlier. In this case, for example, the situation estimating unit 51 decides a factor that is encountered first by the host vehicle along a travel route of the host vehicle as calculated in the automatic control mode as the estimated factor. In addition, for example, the situation estimating unit 51 calculates an estimated time based on a distance to an origin of the estimated factor and a speed of the host vehicle. The situation estimating unit 51 calculates the estimated time by dividing the distance to the origin of the factor by the speed of the host vehicle. The speed of the host vehicle may be acquired by an arbitrary method. For example, the situation estimating unit 51 may acquire angle information indicating a rotation angle of an axle from an axle sensor (not shown) of the host vehicle and calculate the speed of the host vehicle based on a change in the rotation angle as indicated by the acquired angle information. Alternatively, the situation estimating unit 51 may acquire acceleration information indicating an acceleration of the host vehicle from an acceleration sensor (not shown) of the host vehicle and calculate the speed of the host vehicle by integrating the acceleration indicated by the acquired acceleration information. For example, the determination MCU 21 functions as the situation estimating unit 51.

The action acquiring unit 52 retrieves and acquires action characteristic information indicating an action to be taken by the host vehicle with respect to the estimated factor calculated by the situation estimating unit 51 from the volatile storage means 13 or the non-volatile storage means 30. For example, the determination MCU 21, the control MCUs 22 and 23, the action information management server 40, and the data server 41 function as the action acquiring unit 52.

In this case, the action acquiring unit 52 uses the volatile storage means 13 and the non-volatile storage means 30 in a discriminating manner as an acquisition source of the action characteristic information depending on whether or not the estimated time calculated by the situation estimating unit 51 is equal to or shorter than a threshold t1. The threshold t1 is a time arbitrarily set in advance. In addition, when acquiring action characteristic information from the non-volatile storage means 30, the action acquiring unit 52 stores the action characteristic information in the volatile storage means 13.

The output control unit 53 selects optimal action characteristic information according to prescribed criteria from action characteristic information acquired as a result of the retrieval by the action acquiring unit 52. The output control unit 53 controls the host vehicle based on the selected action characteristic information. For example, the control MCU 22 functions as the output control unit 53.

Acquisition of action characteristic information by the action acquiring unit 52 from the volatile storage means 13 or the non-volatile storage means 30 is performed by any one of methods (1) and (2) described below.

(1) In a first method, the determination MCU 21 acquires action characteristic information by retrieving action characteristic information from any one of the volatile storage means 13 and the non-volatile storage means 30.

When the estimated time is equal to or shorter than the threshold t1, the determination MCU 21 retrieves data with a "factor" that is consistent with the estimated factor from the volatile storage means 13. Subsequently, the determination MCU 21 transmits the data acquired by the retrieval to the control MCUs 22 and 23.

On the other hand, when the estimated time is longer than the threshold t1, the determination MCU 21 transmits, to the action information management server 40, request information for requesting data with a "factor" that is consistent with the estimated factor to be retrieved from the non-volatile storage means 30. In response to the request information from the determination MCU 21 via the communication MCU 24, the action information management server 40 transmits instruction information for instructing the retrieval requested by the request information to the data server 41. In accordance with the instruction information from the action information management server 40, the data server 41 retrieves data instructed by the instruction information from the non-volatile storage means 30. In other words, the data server 41 retrieves data with a "factor" that is consistent with the estimated factor from the non-volatile storage means 30. The estimated factor may be made recognizable by the data server 41 by having the request information and the instruction information include information indicating the estimated factor. The data server 41 transmits the data obtained by the retrieval to the action information management server 40. The action information management server 40 transmits the data received from the data server 41 to the control MCUs 22 and 23.

Therefore, the control MCUs 22 and 23 receive data from any one of the determination MCU 21 and the action information management server 40. The control MCUs 22 and 23 acquire action characteristic information included in the received data as a candidate for action characteristic information to be selected and utilized to control the host vehicle.

(2) In a second method, the determination MCU 21 retrieves action characteristic information from both the volatile storage means 13 and the non-volatile storage means 30 and the control MCUs 22 and 23 acquire any one of the action characteristic information obtained by retrieval from the volatile storage means 13 and the action characteristic information obtained by retrieval from the non-volatile storage means 30.

The determination MCU 21 retrieves data from the volatile storage means 13 in a similar manner to the first method described above regardless of whether or not the estimated time is equal to or shorter than the threshold t1. Subsequently, the determination MCU 21 transmits the data acquired by the retrieval to the control MCUs 22 and 23.

In addition, the determination MCU 21 transmits request information for requesting data to be retrieved to the action information management server 40 in a similar manner to the first method described above regardless of whether or not the estimated time is equal to or shorter than the threshold t1. Accordingly, in a similar manner to the description given earlier, the data server 41 performs retrieval of data and the action information management server 40 transmits data obtained as a retrieval result from the data server 41 to the control MCUs 22 and 23.

The determination MCU 21 transmits estimated time information indicating an estimated time to the control MCUs 22 and 23. When the estimated time indicated by the estimated time information received from the determination MCU 21 is equal to or shorter than the threshold t1, the control MCUs 22 and 23 acquire data obtained by the retrieval from the volatile storage means 13 as a candidate for action characteristic information to be selected and utilized to control the host vehicle. In other words, the control MCUs 22 and 23 do not acquire action characteristic information included in the data received from the action information management server 40 as a candidate for action characteristic information to be selected and utilized to control the host vehicle but acquire action characteristic information included in the data received from the determination MCU 21 as a candidate for action characteristic information to be selected and utilized to control the host vehicle. On the other hand, when the estimated time indicated by the estimated time information received from the determination MCU 21 is longer than the threshold t1, the control MCUs 22 and 23 acquire action characteristic information included in data obtained by the retrieval from the non-volatile storage means 30 as a candidate for action characteristic information to be selected and utilized to control the host vehicle. In other words, the control MCUs 22 and 23 do not acquire action characteristic information included in the data received from the determination MCU 21 as a candidate for action characteristic information to be selected and utilized to control the host vehicle but acquire action characteristic information included in the data received from the action information management server 40 as a candidate for action characteristic information to be selected and utilized to control the host vehicle.

In this manner, in the present first embodiment, when a time until encountering a factor to be evaded by the host vehicle is short, action characteristic information is acquired from the volatile storage means 13 which requires only a short time to retrieve action characteristic information. On the other hand, when a time until encountering a factor to be evaded by the host vehicle is long, action characteristic information is acquired from the non-volatile storage means 30 which requires a longer time to retrieve action characteristic information but which enables a larger number of pieces of action characteristic information to be retrieved. Accordingly, even when a time until encountering a factor to be evaded by the host vehicle is short, a best possible action to be taken by the host vehicle can be decided while making the decision without delay before the host vehicle reaches the factor. In addition, when a time until encountering a factor to be evaded by the host vehicle is long, a best possible action to be taken by the host vehicle can be decided from a larger number of actions while obviously making the decision without delay before the host vehicle reaches the factor. Therefore, an action that is suitable for a factor that has occurred with respect to the vehicle can be decided without delay.

In this case, from the perspective of reducing communication traffic, the first method is favorably used rather than the second method. According to the first method, when the estimated time is longer than the threshold t1 and there is not enough time to acquire action characteristic information from the non-volatile storage means 30, action characteristic information is only retrieved from the volatile storage means 13 and retrieval of action characteristic information from the action information management server 40 is not performed. As a result, reception of unnecessary action characteristic information from the data management system 3 by the control MCUs 22 and 23 can be eliminated and communication traffic can be reduced.

Next, an operation of the vehicle control system 2 according to the present first embodiment will be described with reference to FIG. 5. In this case, prior to the operation described below, the vehicle-mounted control system 1 selectively acquires several pieces of data from the data management system 3 among a plurality of pieces of data stored in the non-volatile storage means 30 and stores the acquired data in the volatile storage means 13.

The action acquiring unit 52 acquires data to be stored in the volatile storage means 13 in an initial state from the non-volatile storage means 30 when an ignition power supply of the host vehicle is switched on and power is supplied to the ECU 10 to make the ECU 10 operable. The action acquiring unit 52 stores the acquired data in the volatile storage means 13.

More specifically, when an ignition power supply of the host vehicle is switched on and power is supplied to the ECU 10 to make the ECU 10 operable, the determination MCU 21 transmits request information for requesting transmission of data to be stored in the volatile storage means 13 in an initial state to the action information management server 40. In response to the request information from the determination MCU 21, the action information management server 40 transmits instruction information for instructing acquisition of data to be stored in the volatile storage means 13 in an initial state to the data server 41.

In accordance with the instruction information from the action information management server 40, the data server 41 acquires data to be stored in the volatile storage means 13 in an initial state and transmits the acquired data to the action information management server 40. At this point, the data server 41 acquires at least one piece of data for each "factor". In addition, the data server 41 acquires as many pieces of data as can be stored in the volatile storage means 13 in an ascending order of a "time until facing situation" that is included in the data. The action information management server 40 transmits the data received from the data server 41 to the determination MCU 21. The determination MCU 21 stores the data received from the action information management server 40 in the volatile storage means 13.

Subsequently, when operating in the automatic control mode, the vehicle-mounted control system 1 executes an operation described below. For example, the vehicle-mounted control system 1 executes the operation described below at prescribed constant intervals.

The state recognizing unit 50 acquires image information from the camera 11 and acquires distance information from the sensor 12. Based on the acquired image information and distance information, the state recognizing unit 50 recognizes a state which the host vehicle is in (S1). More specifically, as described earlier, the recognition MCU 20 recognizes a state which the host vehicle is in based on the image information and the distance information.

Based on the state which the host vehicle is in as recognized by the state recognizing unit 50, the situation estimating unit 51 estimates a factor occurring with respect to the host vehicle and a time until the host vehicle faces a situation where the host vehicle reaches an origin of the factor (S2). The factor and the time that are estimated at this point are to be used as the estimated factor and the estimated time described earlier. More specifically, as described earlier, based on the image information and the distance information, the determination MCU 21 estimates a factor occurring with respect to the host vehicle based on recognition result information received from the recognition MCU 20.

The action acquiring unit 52 and the output control unit 53 start retrieving a best possible action from the volatile storage means 13 or the non-volatile storage means 30 (S3). In other words, retrieval of action characteristic information according to the first method or the second method described earlier is started.

When the estimated time calculated by the situation estimating unit 51 is equal to or shorter than the threshold t1 (yes in S4), the action acquiring unit 52 acquires action characteristic information corresponding to the estimated factor calculated by the situation estimating unit 51 from the volatile storage means 13. The output control unit 53 selects an action which can be executed within the estimated time and which has a highest priority e1 among actions indicated by the action characteristic information acquired from the volatile storage means 13 by the action acquiring unit 52 (S5).

On the other hand, when the estimated time calculated by the situation estimating unit 51 is longer than the threshold t1 (no in S4), the action acquiring unit 52 acquires action characteristic information corresponding to the estimated factor calculated by the situation estimating unit 51 from the non-volatile storage means 30. The output control unit 53 selects an action which can be executed within the estimated time calculated by the situation estimating unit 51 and which has a highest priority e1 among actions indicated by the action characteristic information acquired from the non-volatile storage means 30 by the action acquiring unit 52 (S6).

At this point, more specifically, a selection of an action which can be executed within the estimated time calculated by the situation estimating unit 51 and which has a highest priority is performed as described below.

The determination MCU 21 transmits estimated time information indicating an estimated time to the control MCUs 22 and 23. Meanwhile, the control MCUs 22 and 23 have acquired data that indicate the estimated factor as a "factor" from the determination MCU 21 or the action information management server 40 as described earlier. The control MCUs 22 and 23 select an "action" indicated by data with a highest "priority" among acquired data indicating a "time until facing situation" that is equal to or shorter than an estimated time indicated by the estimated time information from the determination MCU 21.

In addition, when an action is selected from the non-volatile storage means 30 (S6), the output control unit 53 determines whether or not a "time until facing situation" indicated by the data including the action characteristic information indicating the selected action is equal to or shorter than the threshold t1 (S7). Moreover, the threshold t1 in step S4 and the threshold t1 in step S7 have the same value. When the output control unit 53 determines that the "time until facing situation" is equal to or shorter than the threshold t1 (yes in S7), the output control unit 53 instructs the action acquiring unit 52 to perform replacement with the data including the action characteristic information indicating the selected action. The action acquiring unit 52 replaces one piece of arbitrary selected data among the plurality of pieces of data stored in the volatile storage means 13 with the data including the action characteristic information selected by the output control unit 53 (S8).

More specifically, the control MCUs 22 and 23 transmit data including the action characteristic information indicating the selected action to the determination MCU 21. The determination MCU 21 replaces one piece of arbitrary selected data among the plurality of pieces of data stored in the volatile storage means 13 with the data transmitted from the control MCUs 22 and 23. Moreover, obviously, only one piece of data is to be replaced regardless of whether both control MCUs 22 and 23 are to transmit data or any one of the control MCUs 22 and 23 is to transmit data. Simply put, overlapping of requests for data replacement can be avoided by having only one control MCU determined in advance among the control MCUs 22 and 23 transmit data. In addition, an arbitrary method may be used as a method of selecting data to be a replacement target among the plurality of pieces of data stored in the volatile storage means 13. For example, data to be a replacement target may be randomly decided.

At this point, favorably, the determination MCU 21 decides data to be a replacement target so that at least data with a shortest "time until facing situation" is retained for each "factor". Accordingly, since a worst case action can be retained in the volatile storage means 13 for each factor that may occur to the host vehicle, any situation can be accommodated. However, this method is not restrictive as long as safety can be guaranteed. For example, as an alternative method, when data with a "time until facing situation" that is equal to or shorter than the estimated time indicated by the estimated time information cannot be found, the control MCUs 22 and 23 may perform, in a fixed manner, a shortest action (for example, stopping in a shortest amount of time) that can be performed by the host vehicle.

Subsequently, the output control unit 53 controls the host vehicle with the selected action (S9). More specifically, as described earlier, the control MCUs 22 and 23 control the host vehicle with the selected action. For example, when the action is a "stop", the control MCU 23 controls the brake so that the host vehicle stops in conformance to the selection action. For example, when the action is a "detour", the control MCU 22 controls the steering system so that the host vehicle evades the factor in conformance to the selection action.

As described above, in the present first embodiment, a plurality of pieces of data which indicate, in association with each other, a factor that occurs with respect to a vehicle and control contents of the vehicle to be performed with respect to the factor are stored in the non-volatile storage means 30. In addition, the volatile storage means 13 enables access at a higher speed than the non-volatile storage means 30 but stores a smaller number of pieces of data than the non-volatile storage means 30. The situation estimating unit 51 estimates a factor and a required time until encountering the factor based on observation results of a periphery of the vehicle. Based on the estimated factor and the data, the action acquiring unit 52 and the output control unit 53 cooperate to decide control contents of the vehicle.

At this point, the action acquiring unit 52 and the output control unit 53 decide the control contents of the vehicle based on data stored in the non-volatile storage means 30 when the estimated required time is longer than a threshold t1 and decide the control contents of the vehicle based on data stored in the volatile storage means 13 when the estimated required time is equal to or shorter than the threshold t1.

Accordingly, when the required time until encountering the factor is long, the action is selected based on data stored in the non-volatile storage means 30. On the other hand, when the required time until encountering the factor is short and there is not sufficient time, the action is selected from the volatile storage means 13 that enables access at a higher speed than the non-volatile storage means 30. Therefore, the vehicle can be controlled with less delay in accordance with a factor that has occurred with respect to the vehicle.

For example, let us assume that all of the plurality of pieces of data shown in FIG. 3 are stored in the non-volatile storage means 30 and that data with "IDs" of "1", "2", "4", "5", "10", and "13" among the plurality of pieces of data shown in FIG. 3 are stored in the volatile storage means 13. Let us also assume that a host vehicle is in a situation where the host vehicle is to reach a "pedestrian" in "4 seconds" and the threshold t1 is set to "5 seconds". In this case, since an estimated time is equal to or shorter than the threshold t1, action characteristic information is selected from data stored in the volatile storage means 13. As a result, action characteristic information of data which includes a "pedestrian" as a "factor" and a "time until facing situation" that is equal to or shorter than the estimated time of "4 seconds" and which has a highest "priority" of "10" is selected. In other words, control of the host vehicle is performed in conformance to a "stop (sudden)" that is indicated by the "action" of the data with the "ID" of "1".

In this manner, when selecting action characteristic information from the non-volatile storage means 30 results in taking "5 seconds" that is longer than "4 seconds" which is the time required by the host vehicle to reach the "pedestrian", action characteristic information can be selected from data stored in the volatile storage means 13 that enables access at a higher speed than the non-volatile storage means 30 and a quick response may be made. Furthermore, in the present first embodiment, an action with a "time until facing situation" that is equal to or shorter than the estimated time is selected. Therefore, as described above, the host vehicle can be stopped before a lapse of "3 seconds" that is shorter than "4 seconds" required by the host vehicle to reach the "pedestrian". In other words, the host vehicle can be controlled with an inclination toward a safer side.

In addition, in the present first embodiment, action characteristic information of data with a highest "priority" is selected among data with a "time until facing situation" that is equal to or shorter than the estimated time. Therefore, even when selecting the action characteristic information from the volatile storage means 13 with a limited number of pieces of data, an effective action can be selected. For example, as in the case of the example described above, while the factor can actually be accommodated by an action represented by the data with an "ID" of "4", even when the data is not stored in the volatile storage means 13, the factor can be evaded by adopting an action represented by the data with an "ID" of "1" which is even more effective. In this manner, by selecting action characteristic information included in data with a higher "priority", the host vehicle can be controlled with an inclination toward a safer side.

First Modification of First Embodiment

In the example described last, when the estimated time until facing the situation is "6 seconds" instead of "4 seconds", action characteristic information can be selected from all of the data stored in the non-volatile storage means 30. However, even in this case, action characteristic information included in the data with an "ID" of "1" is to be selected as action characteristic information included in data with a "time until facing situation" that is equal to or shorter than the estimated time and which has a highest "priority". In other words, even though the time that it actually takes to reach an origin of the factor is the estimated time "6 seconds" and data that is closer thereto exist (data with a "time until facing situation" of "5 seconds"), the action characteristic information included in the data with a "time until facing situation" is "3 seconds" ends up being selected.

In consideration thereof, as a first modification, in order to acquire action characteristic information that is more appropriate, action characteristic information included in data with a "time until facing situation" within a range of time that is shorter by a prescribed time than the estimated time may be selected instead of selecting action characteristic information included in data with a "time until facing situation" that is equal to or shorter than the estimated time as the criteria in steps S5 and S6.

For example, let us assume that the prescribed time is "2 seconds". In this case, in the example described above, action characteristic information included in the data with an "ID" of "2" is selected as action characteristic information included in data with a highest "priority" of "10" among data with a "time until facing situation" that is within a range from "6 seconds" that is the estimated time until facing the situation to "4 seconds" that is 2 seconds shorter than "6 seconds" from the data stored in the non-volatile storage means 30.

Accordingly, in conformance to "6 seconds" that is the time required by the host vehicle to reach the "pedestrian", the host vehicle can be stopped in "5 seconds" instead of in "3 seconds". In other words, in the example described in the first embodiment, the factor can be evaded by a normal stopping operation without having to perform an emergency stopping operation. In this manner, according to the first modification, since a host vehicle can be controlled to evade a factor by using up time that is closer to a time required by the host vehicle to reach an origin of the factor, there is less divergence from an actual situation and control of the host vehicle can be performed without giving a driver a sense of discomfort.

Second Modification of First Embodiment

In the example described in the first modification, action characteristic information included in the data with an "ID" of "2" is to be selected as action characteristic information included in data with a highest "priority" among data with a "time until facing situation" that is within a range from the estimated time to a time that is shorter than the estimated time by a prescribed time. In this case, for example, when the "pedestrian" is actually not traveling, action characteristic information included in data with an "ID" of "6" or "7" which assumes that the "pedestrian" is not traveling is favorably selected. However, even in this case, in the example described so far, action characteristic information included in the data with an "ID" of "2" is selected and control that is excessively inclined toward a side of safety is performed.

In consideration thereof, as a second modification, in order to acquire action characteristic information that is more appropriate, action characteristic information included in data with a "priority" that is closer to a priority estimated based on a recognized state may be selected instead of selecting action characteristic information included in data with a highest "priority" as the criteria in steps S5 and S6. Hereinafter, the estimated priority will also be referred to as an "estimated priority". Moreover, calculation of an estimated priority may be performed by the situation estimating unit 51 based on a state recognized by the state recognizing unit 50 and according to the same calculation criteria as the "priority" in data to be stored in the non-volatile storage means 30. Therefore, for example, when the "pedestrian" is not traveling, "6" is to be calculated as an estimated priority. In addition, the output control unit 53 selects action characteristic information based on the estimated priority calculated by the situation estimating unit 51.

More specifically, the determination MCU 21 calculates an estimated priority based on recognition result information received from the recognition MCU 20. The determination MCU 21 transmits estimated priority information indicating the calculated estimated priority to the control MCUs 22 and 23. The control MCUs 22 and 23 select action characteristic information included in data indicating a "priority" that is closer to the estimated priority indicated by the estimated priority information received from the determination MCU 21.

Accordingly, in the example described in the first modification, action characteristic information included in the data with an "ID" of "6" or "7" is selected as action characteristic information included in data with a "priority" that is closer to the estimated priority of "6" among data with a "time until facing situation" that is within a range from "6 seconds" to "4 seconds" from the data stored in the non-volatile storage means 30.

In this manner, when a "pedestrian" is not traveling, by having the host vehicle evade the "pedestrian" by making a "detour" instead of stopping before reaching the "pedestrian", travel of the host vehicle can be continued while guaranteeing safety. In other words, as described above, while the host vehicle can be controlled with an inclination toward a safer side by selecting action characteristic information included in data with a higher "priority", the selection may sometimes be excessive. By comparison, according to the second modification, since the host vehicle can be controlled in control contents corresponding to an actual situation, control can be performed without giving a driver a sense of discomfort due to a divergence from the actual situation.

Second Embodiment

Next, a second embodiment will be described. Since a configuration of the vehicle-mounted control system 1, a configuration of the vehicle control system 2, and functional blocks of the vehicle control system 2 according to the present second embodiment are similar to those of the first embodiment, a description thereof will be omitted. Hereinafter, a description will be given while omitting contents similar to the first embodiment as appropriate.

The vehicle-mounted control system 1 according to the present second embodiment differs from the vehicle-mounted control system according to the first embodiment in that the vehicle-mounted control system 1 according to the present second embodiment manages a frequency of selection of an action with respect to each of a plurality of pieces of data stored in the volatile storage means 13. In addition, when replacing data stored in the volatile storage means 13, the vehicle-mounted control system 1 according to the present second embodiment preferentially selects data with a low selection frequency as a replacement target.

In other words, in the present second embodiment, when the output control unit 53 selects action characteristic information for controlling the host vehicle from data acquired from the volatile storage means 13, the output control unit 53 instructs the situation estimating unit 51 to update a frequency of data including the action characteristic information. In addition, the situation estimating unit 51 updates the frequency of the data instructed by the output control unit 53.

Furthermore, when action characteristic information for controlling the host vehicle is selected from data acquired from the non-volatile storage means 30 and a plurality of pieces of data stored in the volatile storage means 13 are replaced, action acquiring unit 52 preferentially selects data with a low selection frequency as a replacement target.

In this case, frequency of data is made recognizable by storing frequency information indicating a selection frequency of data in the volatile storage means 13 in association with each piece of data. The frequency information may be information of any format as long as the information represents a selection frequency of data. Typically, for example, frequency information is information indicating the number of times the data has been selected.

Next, an operation of the vehicle control system 2 according to the present second embodiment will be described with reference to FIG. 6. Moreover, in FIG. 6, an operation block that performs a similar operation to an operation block in an operation of the vehicle control system 2 according to the first embodiment shown in FIG. 5 will be denoted using the same reference character and a description thereof will be omitted.

Figure 5:
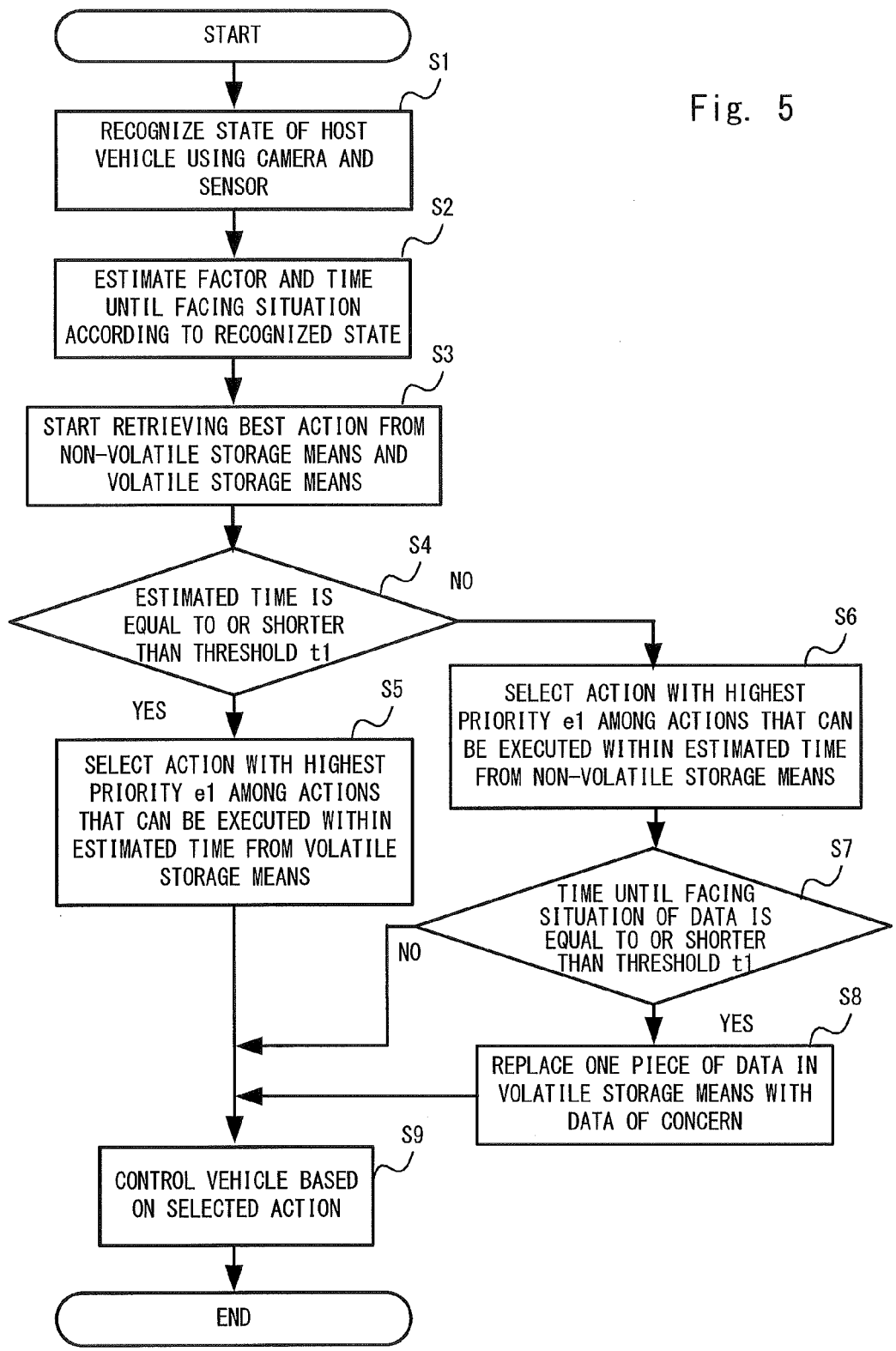
FIG. 5 is a flow chart showing an operation of the vehicle control system according to the first embodiment.
Figure 6:
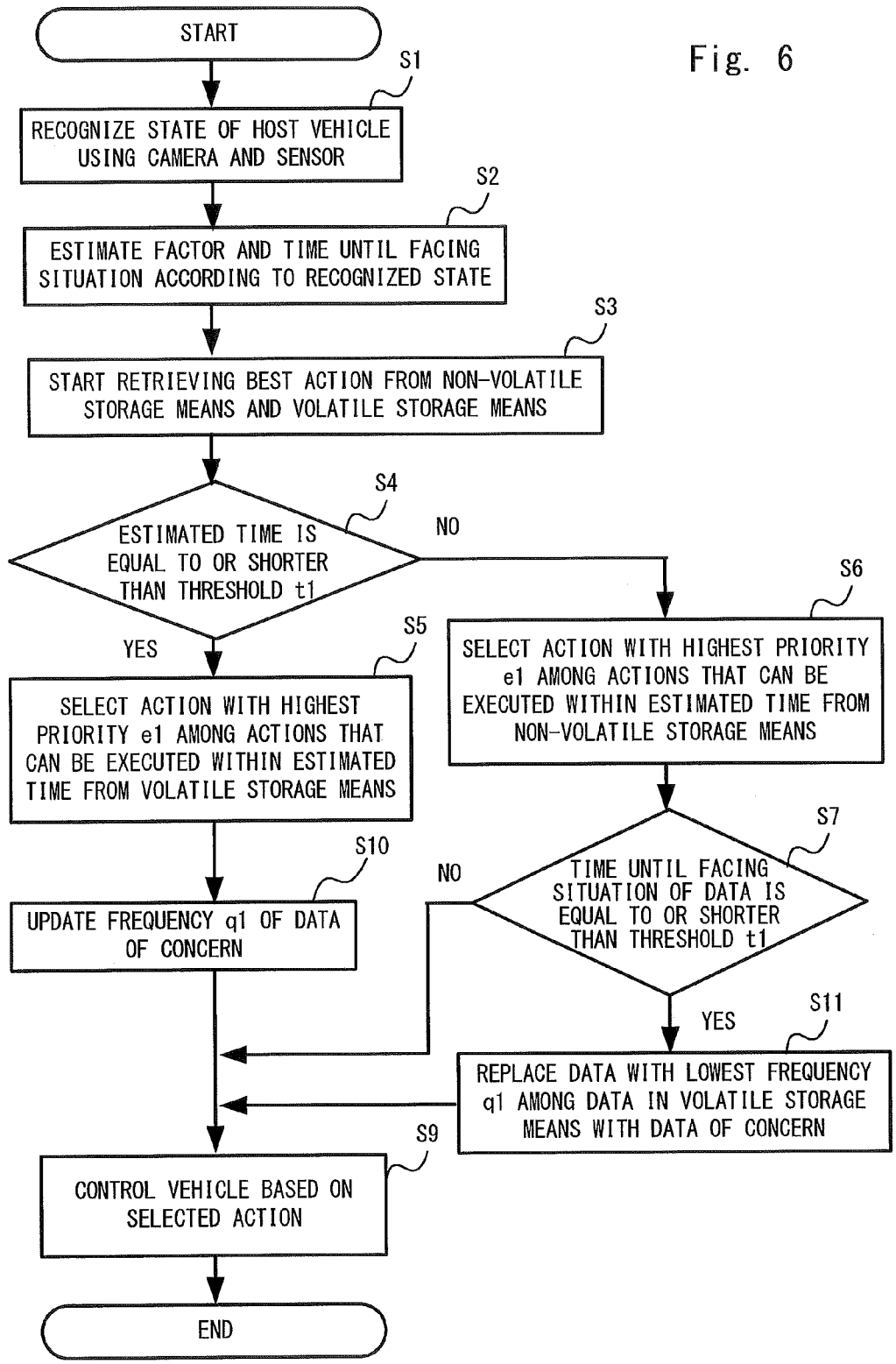
FIG. 6 is a flow chart showing an operation of a vehicle control system according to a second embodiment.

The operation shown in FIG. 6 differs from the operation shown in FIG. 5 in that the operation shown in FIG. 6 includes step S10 as a process following step S5. The operation shown in FIG. 6 also differs from the operation shown in FIG. 5 in that the operation shown in FIG. 6 includes step S11 in place of step S8.

After selection of an action from the volatile storage means 13 (S5), the output control unit 53 instructs the situation estimating unit 51 to update a frequency q1 of data including action characteristic information indicating the action. In addition, the situation estimating unit 51 updates the frequency of the data instructed by the output control unit 53.

More specifically, the control MCUs 22 and 23 transmit instruction information for instructing data including action characteristic information indicating the selected action to be updated to the determination MCU 21. The instruction information includes information identifying data to be an update object. Information that identifies data may be arbitrary information as long as data can be identified. For example, information that identifies data may be the "ID" described earlier.

In accordance with the instruction information from the control MCUs 22 and 23, the determination MCU 21 updates frequency information corresponding to the data for which an update has been instructed among a plurality of pieces of data stored in the volatile storage means 13 so as to indicate a higher frequency (S10). For example, when the frequency information indicates the number of times the data has been selected, the number of selections is increased by 1.

In addition, an action is selected from the non-volatile storage means 30 (S6), and when it is determined that the "time until facing situation" is equal to or shorter than the threshold t1 (yes in S7), the output control unit 53 instructs the action acquiring unit 52 to perform replacement with the data including action characteristic information indicating the selected action. The action acquiring unit 52 replaces data with a lowest frequency among the plurality of pieces of data stored in the volatile storage means 13 with the data including the action characteristic information selected by the output control unit 53 (S11).

More specifically, the control MCUs 22 and 23 transmit data including action characteristic information indicating the selected action to the determination MCU 21. The determination MCU 21 replaces data corresponding to frequency information indicating a lowest frequency with data transmitted from the control MCUs 22 and 23. At this point, favorably, as described in the first embodiment, the determination MCU 21 decides data to be a replacement target so that at least data with a shortest "time until facing situation" is retained for each "factor". Specifically, favorably, at least data corresponding to frequency information indicating a lowest frequency among data other than the data with a shortest "time until facing situation" is set as a replacement target for each "factor". However, as described in the first embodiment, this is not restrictive. In other words, as long as data corresponding to frequency information that indicates a lower frequency is to be preferentially set as a replacement target, various modifications can be made.

As described above, in the present second embodiment, when control contents of a vehicle are decided based on data stored in the non-volatile storage means 30, the action acquiring unit 52 and the output control unit 53 update frequency information corresponding to the data indicating the decided control contents so as to indicate a higher frequency. In addition, the action acquiring unit 52 replaces data corresponding to frequency information that indicates a lower frequency with the preferentially decided data indicating the decided control contents of the vehicle.

Accordingly, a probability of data with a high selection frequency being stored in the volatile storage means 13 increases and the volatile storage means 13 with limited capacity can be effectively utilized.

Third Embodiment

Next, a third embodiment will be described. Since a configuration of the vehicle-mounted control system 1 and a configuration of the vehicle control system 2 according to the present third embodiment are similar to those of the second embodiment, a description thereof will be omitted.

Hereinafter, a description will be given while omitting contents similar to the second embodiment as appropriate.

The vehicle control system 2 according to the present third embodiment performs learning based on contents of an operation by a driver when the vehicle control system 2 according to the second embodiment operates in the manual control mode. Accordingly, an action of the host vehicle based on the operation by the driver is fed back to data stored in the volatile storage means 13 and the non-volatile storage means 30 to optimize the data stored in the volatile storage means 13 and the non-volatile storage means 30.

Next, an example of data stored in the volatile storage means 13 and the non-volatile storage means 30 will be described with reference to FIG. 7. As illustrated in FIG. 7, in the present third embodiment, the data stored in the volatile storage means 13 and the non-volatile storage means 30 further includes information indicating a "result" as compared to data exemplified in the first embodiment with reference to FIG. 3.

A "result" is an evaluation value of an "action". A "result" is updated so that, the more an "action" is actually performed by a vehicle due to an operation by a driver, the higher the "result" is set relative to other data, and the less an "action" is actually performed by a vehicle due to an operation by a driver, the lower the "result" is set relative to other data.

Figure 8:
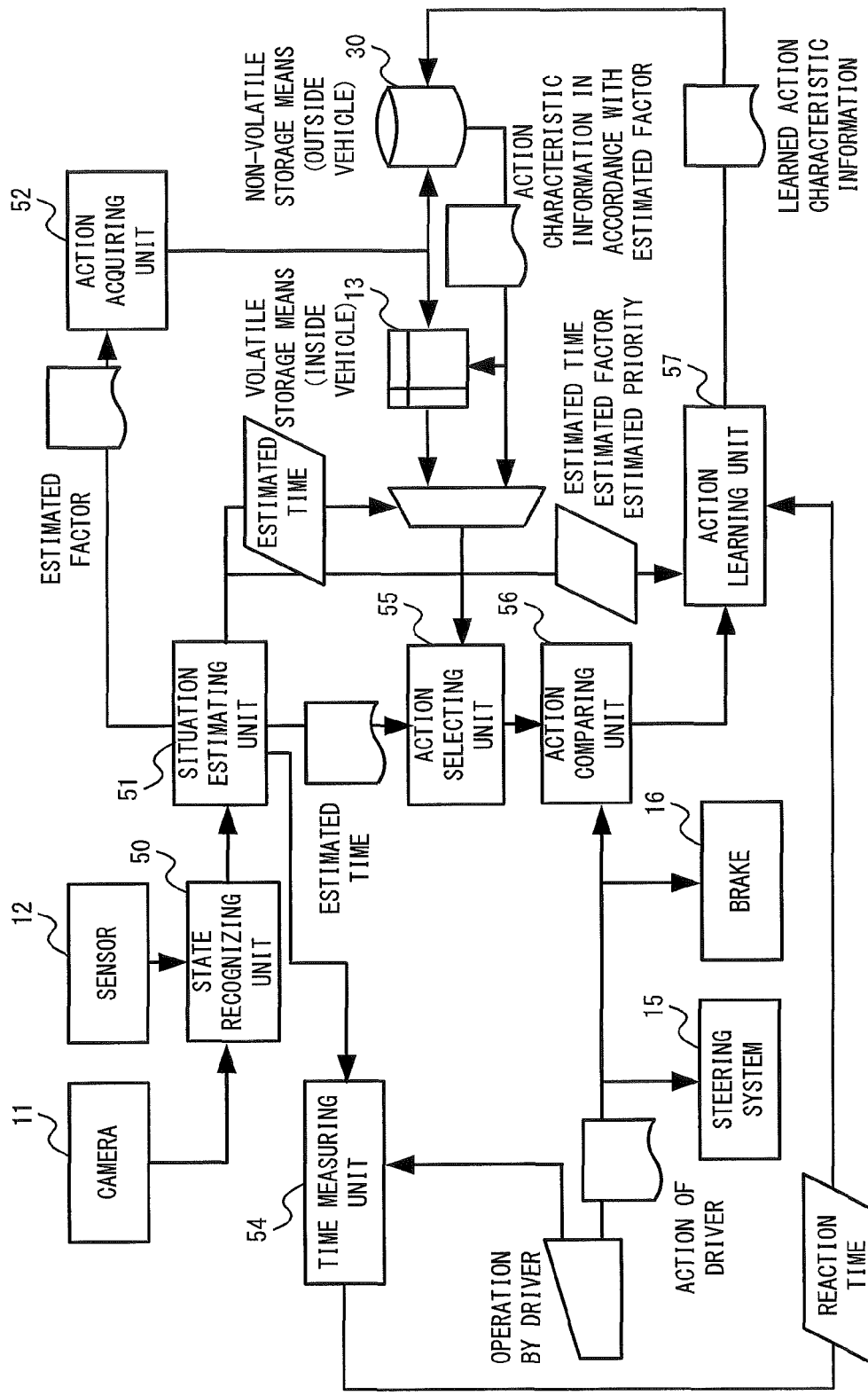
FIG. 8 is a functional block diagram of a vehicle control system according to the third embodiment.

Next, functional blocks of the vehicle control system 2 according to the third embodiment will be described with reference to FIG. 8. As shown in FIG. 8, the vehicle control system 2 according to the third embodiment includes a state recognizing unit 50, a situation estimating unit 51, an action acquiring unit 52, an output control unit 53, a time measuring unit 54, an action selecting unit 55, an action comparing unit 56, and an action learning unit 57.

Since operations of the state recognizing unit 50, the situation estimating unit 51, and the action acquiring unit 52 according to the present third embodiment are similar to operations of the units according to the second embodiment with the exception of the situation estimating unit 51 further calculating an estimated priority based on a state recognized by the state recognizing unit 50, a description thereof will be omitted.

The time measuring unit 54 measures a time from a point when a factor is recognized (estimated) by the situation estimating unit 51 to a point when a driver causes a host vehicle to perform an action to evade the estimated factor. Hereinafter, this time will also be referred to as a "reaction time". The time measuring unit 54 notifies the action learning unit 57 of the measured reaction time. For example, the determination MCU 21 functions as the time measuring unit 54.

The action selecting unit 55 selects optimal action characteristic information according to prescribed criteria from action characteristic information acquired as a result of retrieval by the action acquiring unit 52. However, unlike the output control unit 53 according to the first and second embodiments, the action selecting unit 55 does not perform control of the host vehicle based on the selected action characteristic information. A method of selecting action characteristic information by the action selecting unit 55 is the same as the output control unit 53. For example, the control MCUs 22 and 23 function as the action selecting unit 55.

The action comparing unit 56 compares control contents of the host vehicle in an action performed based on an operation by the driver with control contents of the host vehicle in an action indicated by the action characteristic information selected by the action selecting unit 55. In addition, the action comparing unit 56 notifies the action learning unit 57 of a comparison result. For example, the control MCUs 22 and 23 function as the action comparing unit 56.

The action learning unit 57 performs learning of an action to be taken with respect to an estimated factor based on the comparison result and the reaction time notified from the action comparing unit 56. In other words, the action learning unit 57 newly generates or corrects learned action characteristic information and writes back the action characteristic information to the non-volatile storage means 30. Accordingly, from an operation by the drive with respect to a given estimated factor, an action to be taken with respect to the estimated factor is to be learned. For example, the determination MCU 21, the control MCUs 22 and 23, the action information management server 40, and the data server 41 function as the action learning unit 57.

Figure 9:
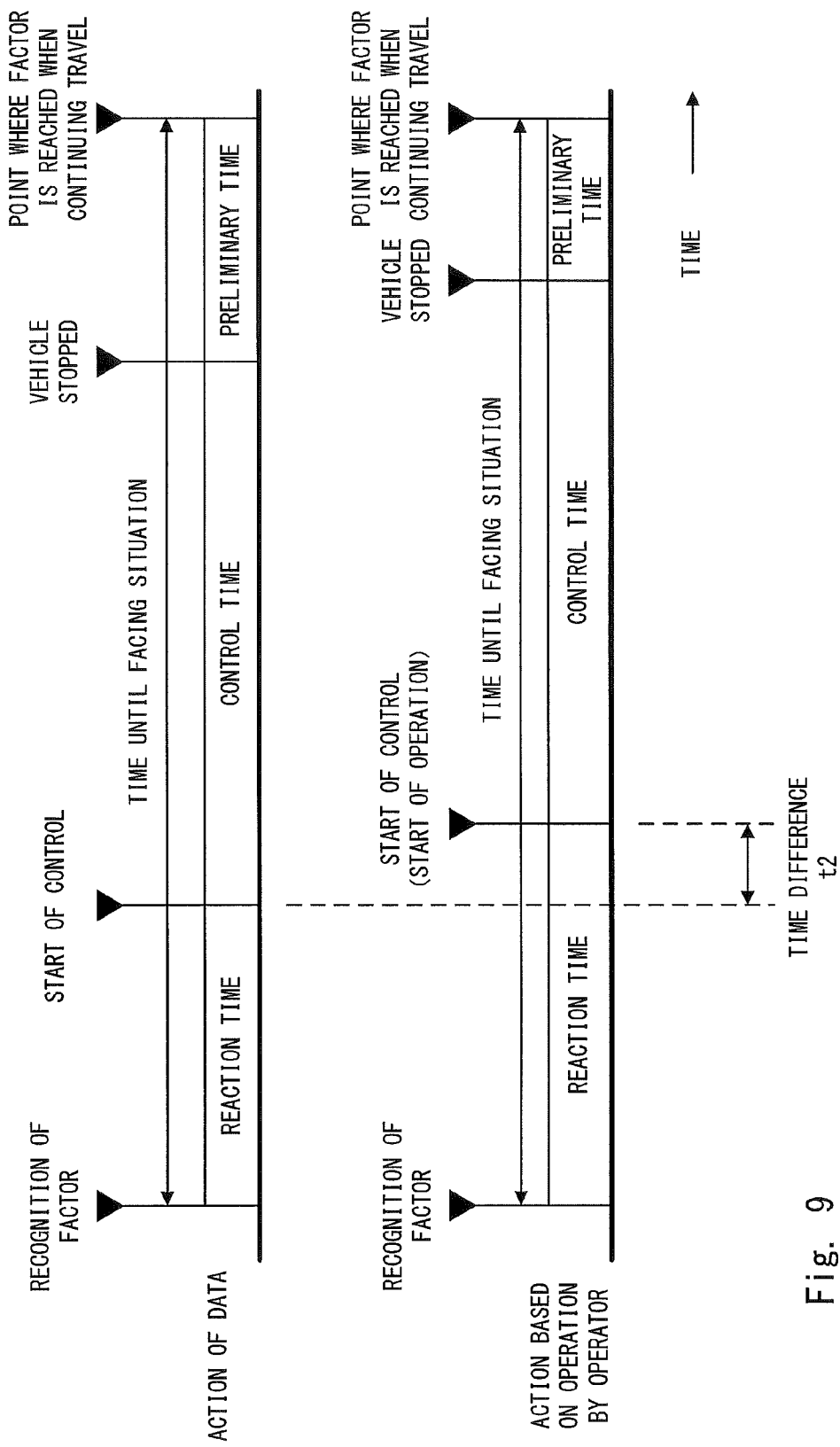
FIG. 9 is a diagram for explaining a learning method according to the third embodiment.

Next, a learning method of the vehicle-mounted control system 1 according to the present third embodiment will be described with reference to FIG. 9.

When a result indicating that the control contents are inconsistent is obtained as a comparison result by the action comparing unit 56, the action learning unit 57 generates action characteristic information indicating an action performed based on an operation by the driver and adds the action characteristic information to the non-volatile storage means 30. On the other hand, when a result indicating that the control contents are consistent is obtained as a comparison result by the action comparing unit 56, the action learning unit 57 corrects selected action characteristic information based on an action performed based on an operation by the driver.

(1) Addition of Action Characteristic Information

In this case, the action learning unit 57 is to add new data to the non-volatile storage means 30. As the data, the action learning unit 57 generates data including an estimated time calculated by the situation estimating unit 51 as a "time until facing situation", an estimated factor calculated by the situation estimating unit 51 as a "factor", an estimated priority calculated by the situation estimating unit 51 as a "priority", and an action performed based on an operation by the driver as an "action". In addition, an "ID" of the data may be set to an arbitrary non-overlapping value. Moreover, estimation of a priority may be performed as described in the second modification of the first embodiment.

Furthermore, in this case, since the selected action characteristic information is to indicate an action that differs from an action desired by the driver, a certain penalty is to be imposed upon the action characteristic information by lowering the priority, lowering a value representing the result, or performing both. In other words, the action learning unit 57 updates data including the action characteristic information so as to lower at least one of the "priority" and the "result".

(2) Correction of Action Characteristic Information

In this case, the action learning unit 57 corrects data including selected action characteristic information among a plurality of pieces of data stored in the non-volatile storage means 30. More specifically, as shown in FIG. 9, control contents of a host vehicle are defined in action characteristic information ("action" in data), and a time ("control time" in FIG. 9) for performing control of the host vehicle based on the control contents is defined in a "time until facing situation". In other words, this means that a time from a point when a factor is recognized to a point when control of the host vehicle is started ("reaction time" in FIG. 9) is defined in "action", and a time following a point when a period of performing the control of the host vehicle by the control contents expires ("preliminary time" in FIG. 9) is also defined in a "time until facing situation".

In this case, the reaction time in the "action" in the data is desirably defined in conformance to a reaction time in a case where control is performed by the driver actually operating the host vehicle. Accordingly, a sense of discomfort that is felt by the driver under control in the automatic drive mode can be reduced.

Therefore, when correcting data, the action learning unit 57 corrects the reaction time in the "action" to an actual reaction time that is measured by the time measuring unit 54. In other words, as shown in FIG. 9, when the actually measured reaction time is longer than the reaction time in the "action" in the data by a time t2, the action learning unit 57 corrects the reaction time in the "action" in the data to a time obtained by adding the time t2 thereto. Moreover, since a control time remains unchanged, the preliminary time is to be corrected to a time obtained by subtracting the time t2 therefrom.

Next, an operation of the vehicle control system 2 according to the present third embodiment will be described with reference to FIGS. 10A and 10B. Moreover, in FIGS. 10A and 10B, an operation block that performs a similar operation to an operation block in an operation of the vehicle control system 2 according to the second embodiment shown in FIG. 6 will be denoted using the same reference character and a description thereof will be omitted.

Figure 10A:
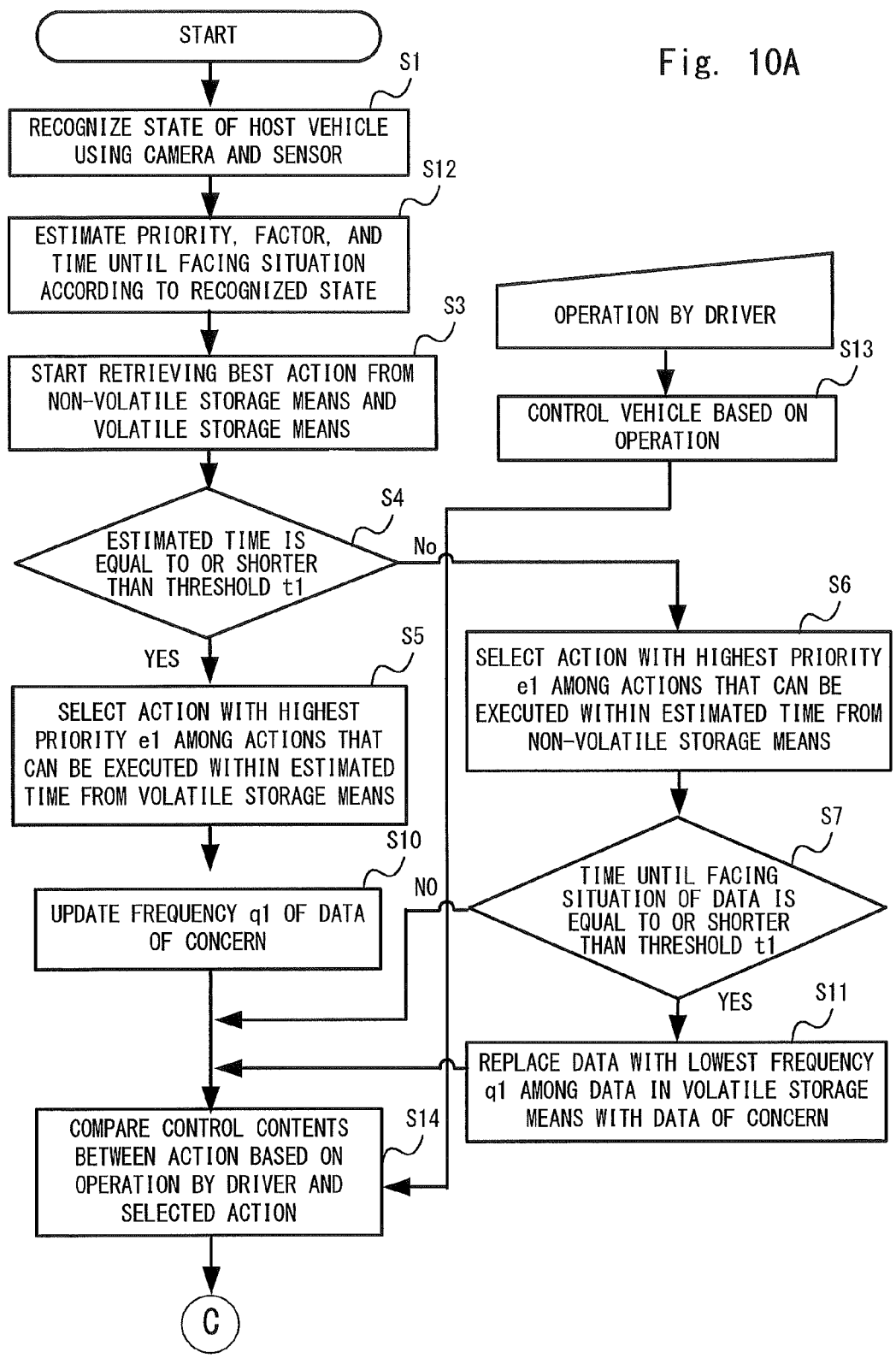
FIG. 10A is a flow chart showing an operation of the vehicle control system according to the third embodiment.
Figure 10B:
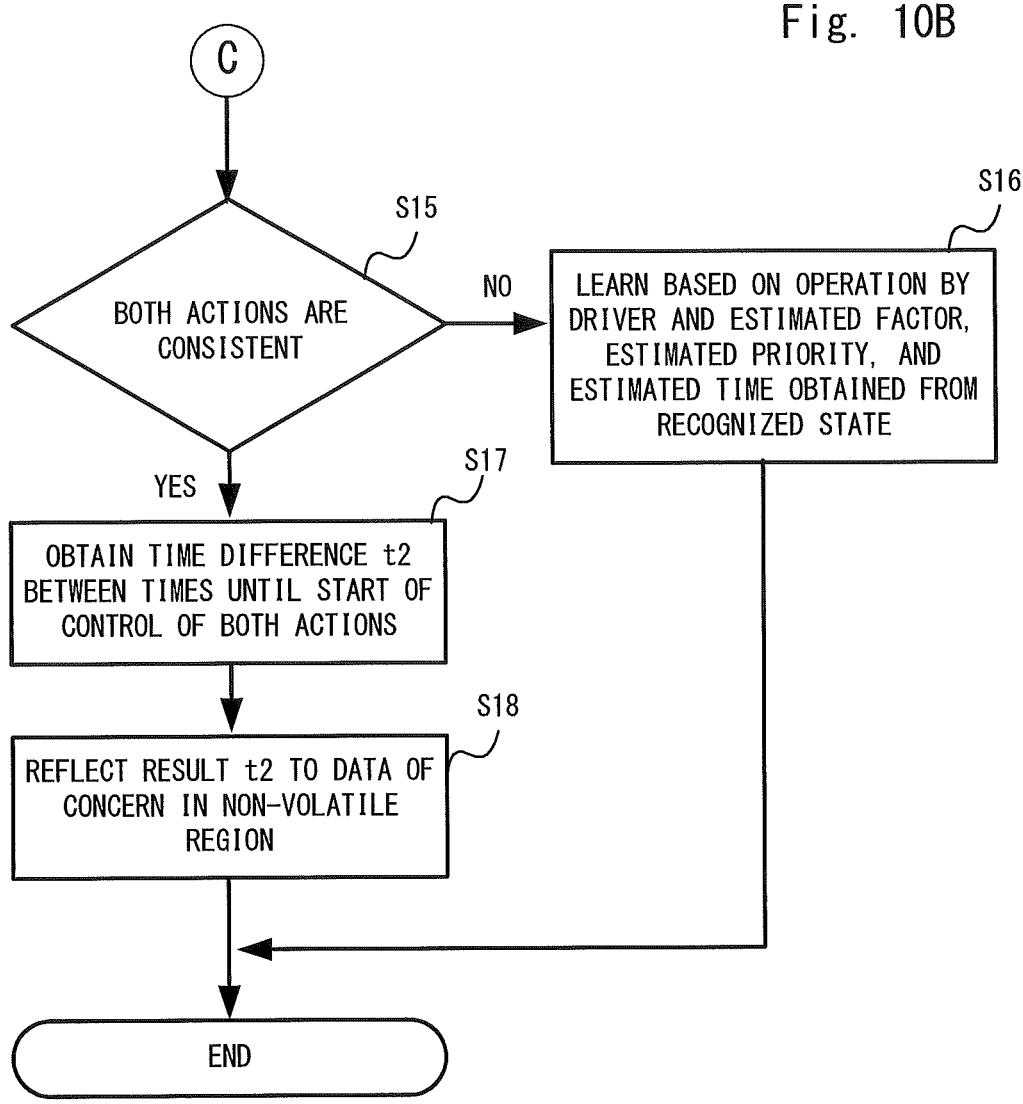
FIG. 10B is a flow chart showing an operation of the vehicle control system according to the third embodiment.

The operation shown in FIGS. 10A and 10B differs from the operation shown in FIG. 6 in that the operation shown in FIGS. 10A and 10B includes step S12 in place of step S2. In addition, the operation shown in FIGS. 10A and 10B differs from the operation shown in FIG. 6 in that the operation shown in FIGS. 10A and 10B includes step S13. Furthermore, the operation shown in FIGS. 10A and 10B differs from the operation shown in FIG. 6 in that step S9 is not included as a process subsequent to step S10, no in step S7, and step S11, and steps S14 to S18 are included.

An operation in step S12 differs from the operation in step S2 in that, in step S12 according to the present third embodiment, an estimated priority is further calculated. In other words, based on a state which the host vehicle is in as recognized by the state recognizing unit 50, the situation estimating unit 51 estimates a factor occurring with respect to the host vehicle, a time until the host vehicle faces a situation where the host vehicle reaches an origin of the factor, and a priority of the factor (S12). The factor, the time, and the priority that are estimated at this point are the estimated factor, the estimated time, and the estimated priority described earlier.

In addition, the vehicle-mounted control system 1 controls the host vehicle based on an operation by the driver (S13). More specifically, the control MCUs 22 and 23 control the host vehicle based on an operation by the driver.

The control MCU 22 controls the steering system 15 of the host vehicle based on contents of an operation by the driver. For example, a handle operation is detected by a steering angle sensor (not shown) that is provided on a handle. The steering angle sensor detects a steering angle of the handle that is created as a result of a handle operation by the driver and generates operation information indicating the detected steering angle. An operation MCU (not shown) included in the vehicle-mounted control system 1 transmits operation information that is generated by the steering angle sensor to the control MCU 22. Accordingly, the control MCU 22 controls the steering system 15 of the host vehicle based on operation information received from the operation MCU.

In addition, the control MCU 22 controls the brake 16 of the host vehicle based on a brake operation by the driver. For example, a brake operation is detected by a brake pedal position sensor (not shown) that is provided on a brake pedal. The brake pedal position sensor detects a depression amount of the brake pedal due to the brake operation by the driver and generates operation information indicating the detected depression amount. An operation MCU (not shown) included in the vehicle-mounted control system 1 transmits operation information that is generated by the brake pedal position sensor to the control MCU 23. Accordingly, the control MCU 23 controls the brake 16 of the host vehicle based on operation information received from the operation MCU.

After selection of an action (S5 or S6) from the volatile storage means 13 or the non-volatile storage means 30, the action comparing unit 56 compares control contents of the host vehicle in an action performed based on an operation by the driver with control contents of the host vehicle in an action indicated by action characteristic information selected by the action selecting unit 44 (S14).

More specifically, the control MCUs 22 and 23 compare control contents of the host vehicle which is performed based on operation information received from the operation MCU with control contents of the host vehicle in an action indicated by the selected action characteristic information.

When the action comparing unit 56 determines that the control contents are inconsistent (no in S15), the action learning unit 57 performs learning based on the action performed based on the operation by the driver and the estimated factor, the estimated priority, and the estimated time calculated based on the recognized state (S16).

More specifically, when it is determined that the compared control contents are inconsistent, the control MCUs 22 and 23 transmit notification information which notifies that the compared control contents are inconsistent to the determination MCU 21. The notification information includes information indicating the action performed based on the operation by the driver.

In accordance with the notification information from the control MCUs 22 and 23, the determination MCU 21 transmits request information for requesting addition of data to be performed to the action information management server 40 via the communication MCU 24. The request information includes information indicating a "time until facing situation", a "factor", a "priority", and an "action" that are included in data to be newly added. The "time until facing situation", the "factor", and the "priority" are, respectively, the estimated time, the estimated factor, and the estimated priority calculated by the determination MCU 21. In addition, the "action" is the action which is indicated by the notification information received from the control MCUs 22 and 23 and which is performed based on an operation by the driver.

In response to the request information from the determination MCU 21 via the communication MCU 24, the action information management server 40 transmits instruction information for instructing addition of data to the data server 41. The instruction information includes information indicating the "time until facing situation", the "factor", the "priority", and the "action" that are included in the request information. The data server 41 generates new data and additionally stores the data in the non-volatile storage means 30 in accordance with the instruction information from the action information management server 40. The "time until facing situation", the "factor", the "priority", and the "action" in the data represent contents included in the instruction information. In addition, as an "ID" of the data, the data server 41 may decide a value that does not overlap with data stored in the non-volatile storage means 30.

Furthermore, the action learning unit 57 imposes a certain penalty upon the selected action characteristic information by lowering a priority thereof, lowering a value representing the result, or performing both.

More specifically, information that identifies the selected data is included in the notification information, the request information, and the instruction information described above. In addition, in accordance with the instruction information from the action information management server 40, the data server 41 updates data identified by the instruction information so as to impose the penalty described above. Moreover, when data that is a target is stored in the volatile storage means 13, the determination MCU 21 may also update the data in a similar manner in accordance with the notification information.

Accordingly, when a priority is to be lowered, since a "priority" of data indicating an action that is not performed by the driver among the data is lowered, an "action" represented by the data is less likely to be selected. As a result, a sense of discomfort that is felt by the driver under control in the automatic drive mode can be reduced. For example, when an action of data with an "ID" of "5" is more frequently used than an action of data with an "ID" of "4" as shown in FIG. 7 in a manual drive mode, a "priority" of the data with an "ID" of "4" is adjusted to be lower than a "priority" of the data with an "ID" of "5". Therefore, learning is performed so that the action of the data with an "ID" of "5" is preferentially selected over the action of the data with an "ID" of "4" in the automatic drive mode.

In addition, a value of a "result" is used to manage data. For example, when the value of a "result" is below a prescribed threshold, the data server 41 may delete the data from the non-volatile storage means 30. Accordingly, the probability of data that is not used by the driver being stored in the volatile storage means 13 and the non-volatile storage means 30 can be reduced.

On the other hand, when the action comparing unit 56 determines that the control contents are consistent (yes in S15), the action learning unit 57 compares a reaction time in an action performed based on the operation by the driver with a reaction time in an action indicated by the action characteristic information selected by the action selecting unit 55 and calculates a time difference t2 between the reaction times (S17).

More specifically, when it is determined that the compared control contents are consistent, the control MCUs 22 and 23 transmit notification information which notifies that the compared control contents are consistent to the determination MCU 21. The notification information includes data of the selected action characteristic information.

In accordance with the notification information from the control MCUs 22 and 23, the determination MCU 21 compares a reaction time in an action performed based on the operation by the driver with a reaction time in an action indicated by the selected action characteristic information and calculates a time difference t2 between the reaction times. The reaction time in an action indicated by the selected action characteristic information is recognized from an action indicated by action characteristic information in the data received from the control MCUs 22 and 23. In addition, for the reaction time in an action performed based on the operation by the driver, a notification at a point when an operation by the driver is started may be received from the control MCUs 22 and 23 and a time from a point when a factor is recognized (estimated) to a point when the notification of a start of the operation by the driver is received may be adopted as the reaction time.

The action learning unit 57 reflects the calculated time t2 in data in the non-volatile storage means 30 (S18). More specifically, the determination MCU 21 transmits request information for requesting correction of data to the action information management server 40. For example, the request information includes target identification information for identifying data that is a correction target and time difference information indicating the calculated time difference t2. As information identifying data that is a correction target, for example, an "ID" of data included in the notification information from the control MCUs 22 and 23 may be used.

The action information management server 40 transmits instruction information for instructing correction of data to the data server 41 in accordance with the request information from the determination MCU 21. The instruction information includes the target identification information and the time difference information included in the request information. In accordance with the instruction information from the action information management server 40, the data server 41 corrects data that is the correction target in the non-volatile storage means 30. In other words, correction is performed so that a reaction time in an "action" in the data that is the correction target equals a reaction time in an action that is actually performed based on the time difference t2 indicated in the instruction information. Moreover, the data that is the correction target is identified based on the target identification information included in the instruction information. In addition, when data that is a target is stored in the volatile storage means 13, the determination MCU 21 may also correct the data in a similar manner.

As described above, in the present third embodiment, the action comparing unit 56 compares decided control contents of a vehicle with control contents of the vehicle based on an operation performed by a driver with respect to a factor. In addition, when the compared control contents are not consistent, the action learning unit 57 additionally stores data indicating the factor and control contents of the vehicle based on an operation performed by the driver with respect to the factor in association with each other in the non-volatile storage means 30. Furthermore, in the present third embodiment, when the compared control contents are consistent, the action learning unit 57 corrects a reaction time in data indicating decided control contents of the vehicle so as to approach a measured reaction time.

Accordingly, since control contents of the vehicle in an action performed in the automatic control mode, a time until a start of the action, and the like can be approximated to those when the driver actually performs driving, a sense of discomfort that is felt by the drive can be reduced.

Fourth Embodiment

Next, a fourth embodiment will be described. Since a configuration of the vehicle-mounted control system 1 and a configuration of the vehicle control system 2 according to the present fourth embodiment are similar to those of the third embodiment, a description thereof will be omitted. Hereinafter, a description will be given while omitting contents similar to the third embodiment as appropriate.

Compared to the vehicle control system 2 according to the third embodiment, the vehicle control system 2 according to the present fourth embodiment performs learning based on contents of an operation by a driver when operating in the automatic control mode instead of in the manual control mode. In other words, in the present fourth embodiment, instead of performing an operation in order to actually control a host vehicle, the driver performs an operation in order to teach how the host vehicle would be controlled if the host vehicle was to be controlled by the driver.

Figure 11:
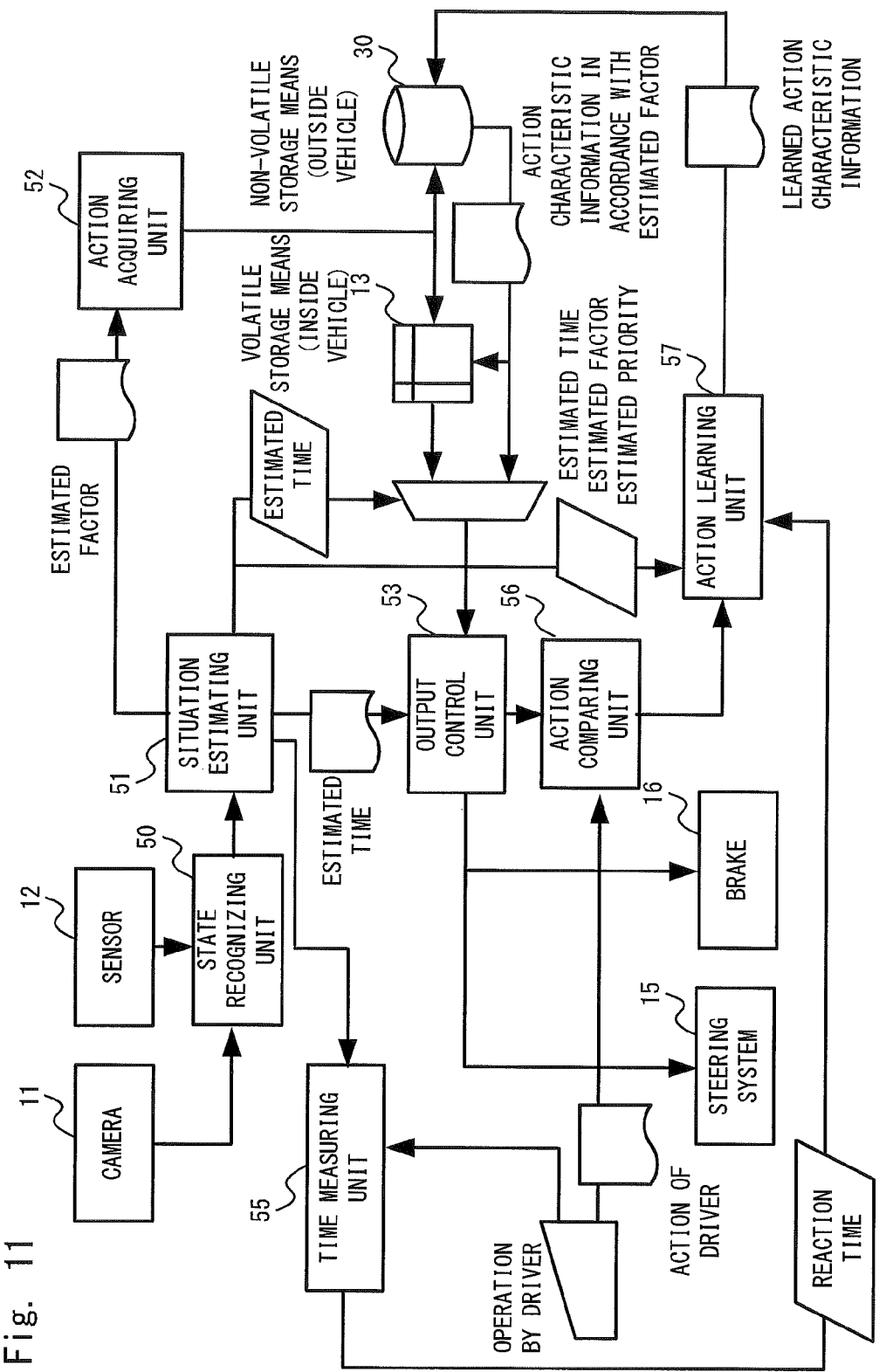
FIG. 11 is a functional block diagram of a vehicle control system according to a fourth embodiment.

Next, functional blocks of the vehicle control system 2 according to the fourth embodiment will be described with reference to FIG. 11. As shown in FIG. 11, the vehicle control system 2 according to the fourth embodiment includes a state recognizing unit 50, a situation estimating unit 51, an action acquiring unit 52, an output control unit 53, a time measuring unit 54, an action comparing unit 56, and an action learning unit 57.

Since operations of the state recognizing unit 50, the situation estimating unit 51, the action acquiring unit 52, the time measuring unit 54, the action comparing unit 56, and the action learning unit 57 according to the present fourth embodiment are similar to operations of the units according to the third embodiment with the exception of the action comparing unit 56 setting control contents of a host vehicle in an action to be performed based on an operation by a driver as a comparison target instead of control contents of the host vehicle in an action that has actually been performed based an operation by a driver, a description thereof will be omitted. In addition, since an operation of the output control unit 53 according to the present fourth embodiment is similar to the operation of the output control unit 53 according to the third embodiment, a description thereof will be omitted.

Next, an operation of the vehicle control system 2 according to the present fourth embodiment will be described with reference to FIGS. 12 and 13. Moreover, in FIGS. 12 and 13, an operation block that performs a similar operation to an operation block in an operation of the vehicle control system 2 according to the second embodiment shown in FIG. 6 or an operation block in an operation of the vehicle control system 2 according to the third embodiment shown in FIGS. 10A and 10B will be denoted using the same reference character and a description thereof will be omitted.

Figure 12:
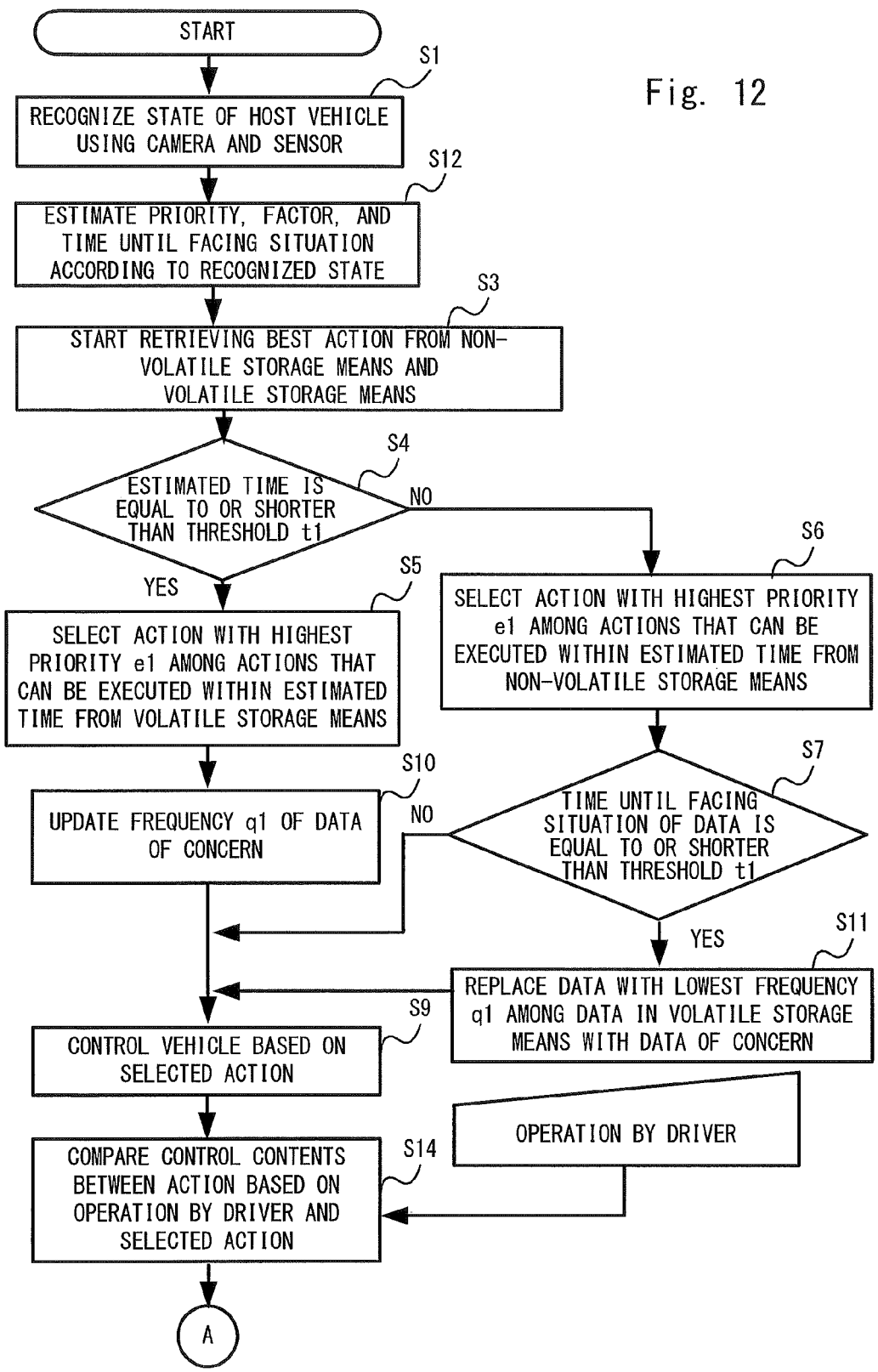
FIG. 12 is a flow chart showing an operation of the vehicle control system according to the fourth embodiment.
Figure 13:
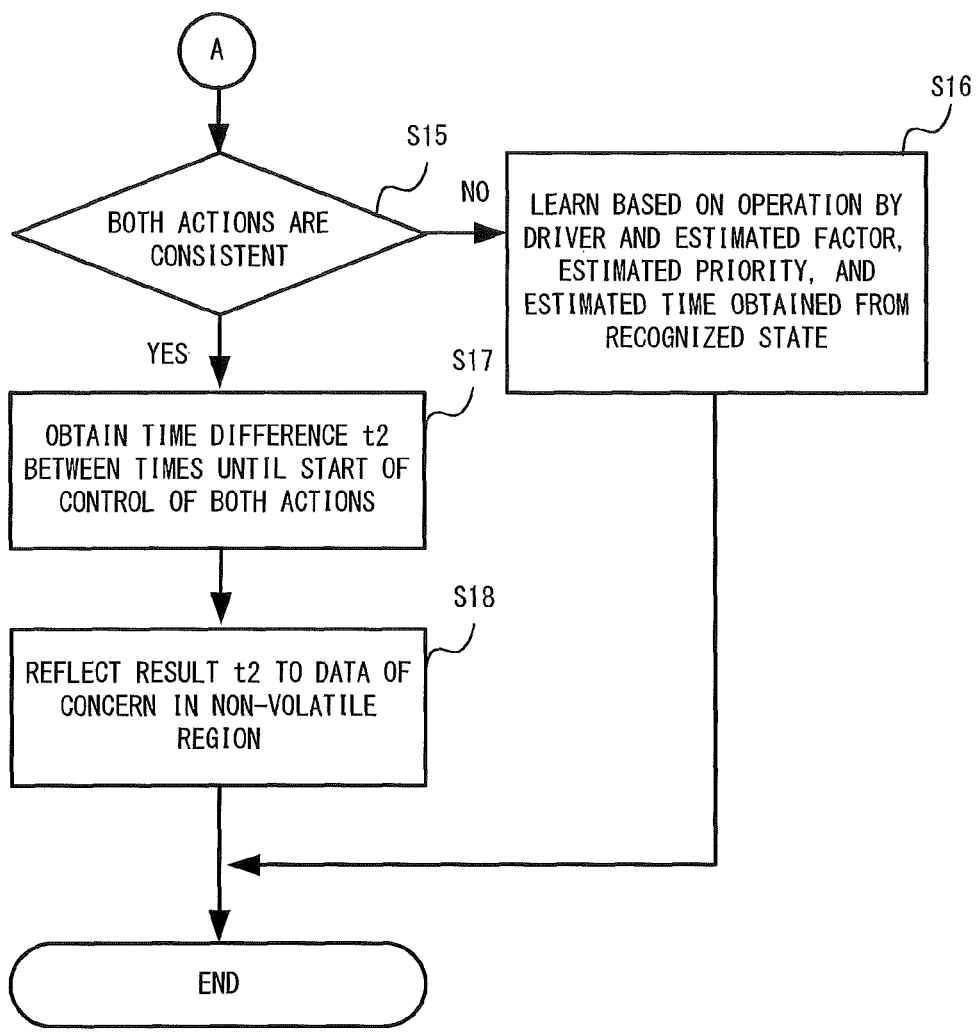
FIG. 13 is a flow chart showing an operation of the vehicle control system according to the fourth embodiment.

The operation shown in FIGS. 12 and 13 differs from the operation shown in FIGS. 10A and 10B in that the operation shown in FIGS. 12 and 13 does not include step S13. The operation shown in FIGS. 12 and 13 differs from the operation shown in FIGS. 10A and 10B in that step S9 is further included as a process subsequent to step S10, no in step S7, and step S11, and steps S14 to S18 are included as steps subsequent thereto.

Furthermore, in the present fourth embodiment, in step S14, the action comparing unit 56 sets control contents of a host vehicle in an action to be performed based on an operation by a driver as a comparison target instead of control contents of the host vehicle in an action that has actually been performed based an operation by a driver.

As described above, learning based on contents of an operation by the driver can also be performed in the automatic control mode. Accordingly, in a similar manner to the third embodiment, since control contents of the vehicle in an action performed in the automatic control mode, a time until a start of the action, and the like can be approximated to those when the driver actually performs driving, a sense of discomfort that is felt by the drive can be reduced.

Fifth Embodiment

Figure 14:
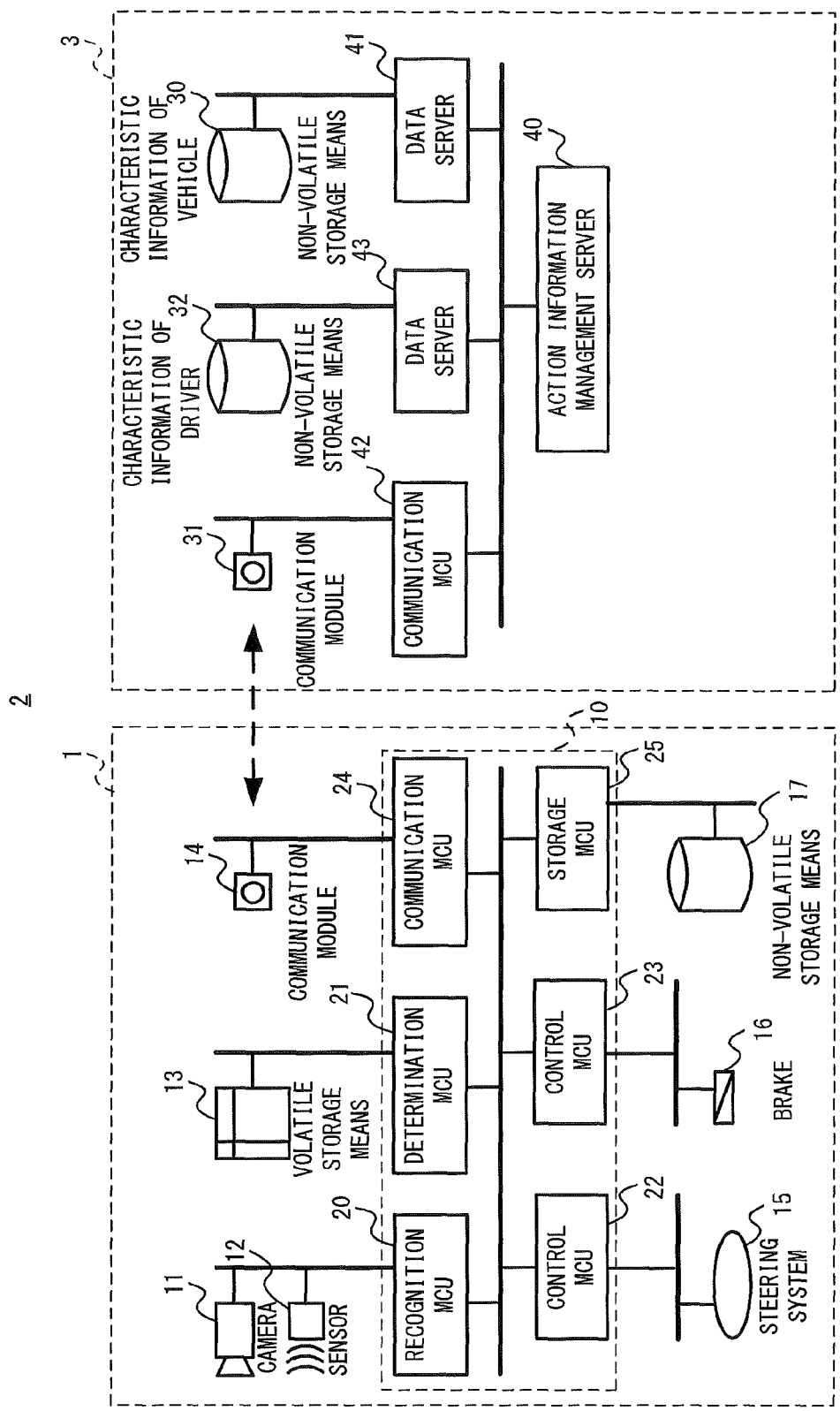
FIG. 14 is a configuration diagram of a vehicle control system according to a fifth embodiment.

Next, a fifth embodiment will be described. Hereinafter, a description will be given while omitting contents similar to the fourth embodiment as appropriate. A configuration of a vehicle control system 2 according to the present fifth embodiment will now be described with reference to FIG. 14.

The vehicle control system 2 according to the present fifth embodiment differs from the vehicle control system 2 according to the fourth embodiment in that the vehicle-mounted control system 1 further includes non-volatile storage means 17 and a storage MCU 25 and that the data management system 3 further includes non-volatile storage means 32 and a data server 43.

The non-volatile storage means 17 stores a plurality of pieces of action characteristic information. The non-volatile storage means 17 is capable of retaining information regardless of whether power is being supplied or not. For example, the non-volatile storage means 17 is configured so as to include at least one non-volatile memory or at least one hard disk, or a combination thereof.

The storage MCU 25 controls writing of information to the non-volatile storage means 17 and reading of information from the non-volatile storage means 17.

The data server 43 functions in a similar manner to the data server 41. In addition, the non-volatile storage means 32 also functions in a similar manner to the non-volatile storage means 30. In other words, the data server 43 includes the non-volatile storage means 32. In this case, the data server 43 differs from the data server 41 in that the data server 43 manages action characteristic information with respect to each driver. In other words, while the non-volatile storage means 30 stores a plurality of pieces of action characteristic information with respect to a vehicle, the non-volatile storage means 32 stores a plurality of pieces of action characteristic information with respect to a plurality of drivers. Therefore, as will be described later, the data server 43 provides the vehicle-mounted control system 1 with action characteristic information corresponding to an authenticated driver among the action characteristic information stored in the non-volatile storage means 32.

Compared to the non-volatile storage means 30 and the non-volatile storage means 32, the volatile storage means 13 and the non-volatile storage means 17 enable data to be accessed from the ECU 10 at a higher speed but the number of pieces of data that can be retained is smaller. On the other hand, compared to the volatile storage means 13 and the non-volatile storage means 17, data in the non-volatile storage means 30 and the non-volatile storage means 32 can only be accessed by the ECU 10 at a lower speed but the non-volatile storage means 30 and the non-volatile storage means 32 are capable of retaining a greater number of pieces of data. In other words, capacities of the volatile storage means 13 and the non-volatile storage means 17 are too small to store all of the data that is stored in the non-volatile storage means 30 and the non-volatile storage means 32.

Figure 15:
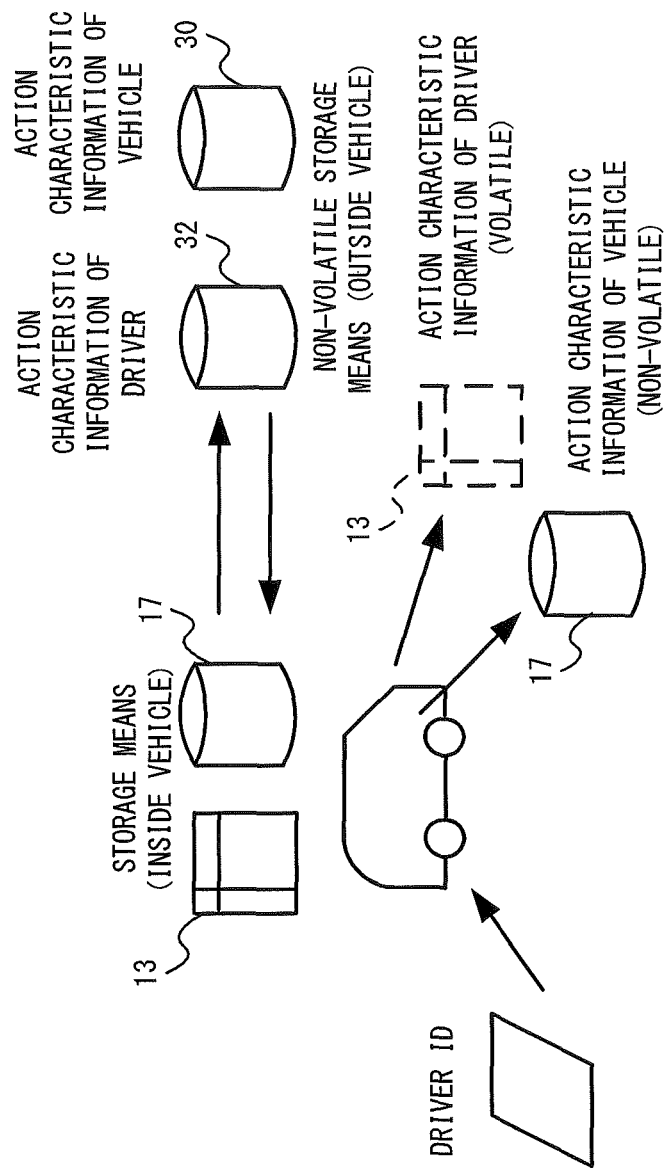
FIG. 15 is a diagram showing a concept of action characteristic information management according to the fifth embodiment.

As shown in FIG. 15, generally, several pieces of data among the plurality of pieces of data stored in the non-volatile storage means 32 are stored in the volatile storage means 13. Moreover, data in the non-volatile storage means 30 may sometimes be stored in the volatile storage means 13. In addition, as shown in FIG. 15, several pieces of data among the plurality of pieces of data stored in the nonvolatile storage means 32 are selectively stored in the non-volatile storage means 17. In other words, data stored in the non-volatile storage means 32 is not stored in the non-volatile storage means 17. A reason therefor will be described later.

Figure 16:
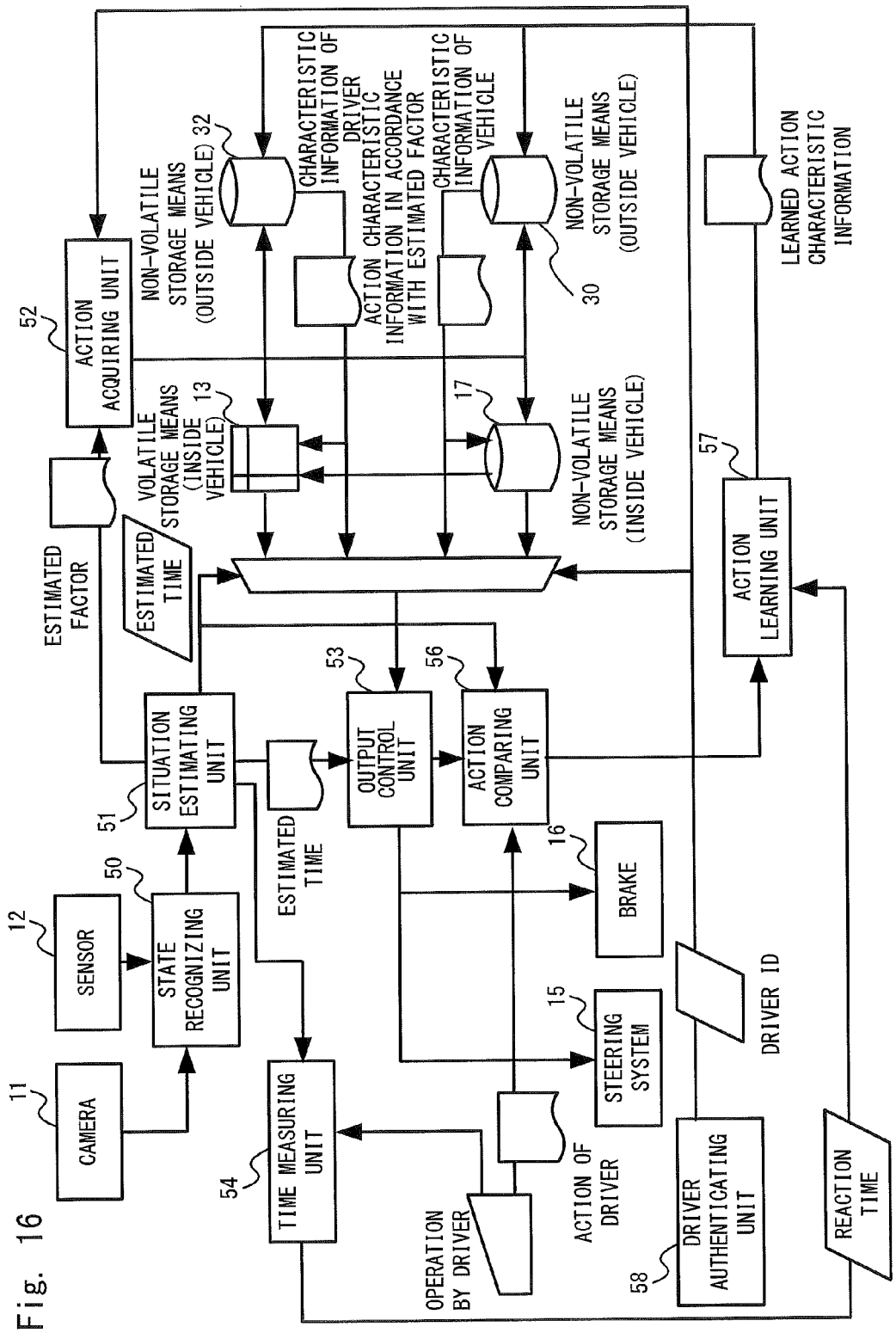
FIG. 16 is a functional block diagram of the vehicle control system according to the fifth embodiment.

Next, functional blocks of the vehicle control system 2 according to the fifth embodiment will be described with reference to FIG. 16. As shown in FIG. 16, the vehicle control system 2 according to the fifth embodiment includes a state recognizing unit 50, a situation estimating unit 51, an action acquiring unit 52, an output control unit 53, a time measuring unit 54, an action comparing unit 56, an action learning unit 57, and a driver authenticating unit 58.

While the state recognizing unit 50, the situation estimating unit 51, the action acquiring unit 52, the output control unit 53, the time measuring unit 54, the action comparing unit 56, and the action learning unit 57 operate in a similar manner to the units according to the fourth embodiment but differ in the following points.

While the action acquiring unit 52 acquires action characteristic information in a similar manner to the action acquiring unit 52 according to the fourth embodiment, the action acquiring unit 52 changes an acquisition source depending on an authentication status of a driver by the driver authenticating unit 58. When a driver is authenticated by the driver authenticating unit 58, the action acquiring unit 52 sets all of the volatile storage means 13 and the non-volatile storage means 17, 30, and 32 as objects of retrieval of action characteristic information. On the other hand, when a driver is not authenticated by the driver authenticating unit 58, while the volatile storage means 13 and the non-volatile storage means 30 which store action characteristic information of the driver are not considered objects of retrieval of action characteristic information, the non-volatile storage means 17 and 32 which store action characteristic information of a vehicle are set as objects of retrieval of action characteristic information.

Furthermore, when an estimated time calculated by the situation estimating unit 51 is equal to or shorter than a threshold t1, the action acquiring unit 52 sets the volatile storage means 13 and the non-volatile storage means 17 which are located inside a vehicle as objects of retrieval of action characteristic information. On the other hand, when an estimated time calculated by the situation estimating unit 51 longer than the threshold t1, the action acquiring unit 52 sets the non-volatile storage means 30 and 32 which are located outside of a vehicle as objects of retrieval of action characteristic information. For example, the determination MCU 21, the control MCUs 22 and 23, the action information management server 40, and the data servers 41 and 43 function as the action acquiring unit 52.

Therefore, objects of retrieval corresponding to an authentication status and a time until facing a situation may summarized as follows.

(1) Driver is authenticated and estimated time is longer than the threshold t1
   Non-volatile storage means 30 and 32
(2) Driver is authenticated and estimated time is equal to or shorter than the threshold t1
   Volatile storage means 13 and non-volatile storage means 17
(3) Driver is not authenticated and estimated time is longer than the threshold t1
   Non-volatile storage means 30
(4) Driver is not authenticated and estimated time is equal to or shorter than the threshold t1
   Non-volatile storage means 17

Although the action learning unit 57 performs learning in a similar manner to the action learning unit 57 according to the fourth embodiment, the action learning unit 57 changes a reflection destination of learned action characteristic information depending on whether action characteristic information is to be added or corrected. When action characteristic information is to be added, the action learning unit 57 reflects learned action characteristic information in both the non-volatile storage means 30 and the non-volatile storage means 32. On the other hand, when the action characteristic information is to be corrected, the action learning unit 57 reflects learned action characteristic information only on the non-volatile storage means 32 storing action characteristic information of a driver and does not reflect learned action characteristic information on the non-volatile storage means 32 storing action characteristic information of a vehicle.

When correcting action characteristic information, as described with reference to FIG. 9, a reaction time in an action indicated by the action characteristic information is corrected according to an actual operation by the driver. In other words, since habits of the driver are reflected, it is not favorable to have learning results reflected on action characteristic information of a vehicle that is shared with other drivers. Therefore, when correcting action characteristic information, a reflection destination of learning is limited to the non-volatile storage means 32 storing action characteristic information of drivers. On the other hand, addition of action characteristic information does not affect existing action characteristic information. Therefore, in this case, action characteristic information is reflected on both the non-volatile storage means 30 and the non-volatile storage means 32.

The driver authenticating unit 58 authenticates a driver in response to input of authentication information by the driver via an input device (not shown). For example, the authentication information includes a driver ID and a password. When authentication information input by a driver matches an expected value, the driver authenticating unit 58 assumes the driver to be authenticated. On the other hand, when authentication information input by a driver does not match an expected value, the driver authenticating unit 58 leaves the driver unauthenticated. Moreover, an arbitrary device may be used as the input device. For example, a touch panel or operation buttons may be used as the input device. For example, the determination MCU 21 functions as the driver authenticating unit 58.

Next, an operation of the vehicle control system 2 according to the present fifth embodiment will be described with reference to FIGS. 17A, 17B and 18. Moreover, in FIGS. 17A, 17B and 18, an operation block that performs a similar operation to an operation block in an operation of the vehicle control system 2 according to the fourth embodiment shown in FIG. 12 will be denoted using the same reference character and a description thereof will be omitted.

Figure 17A:
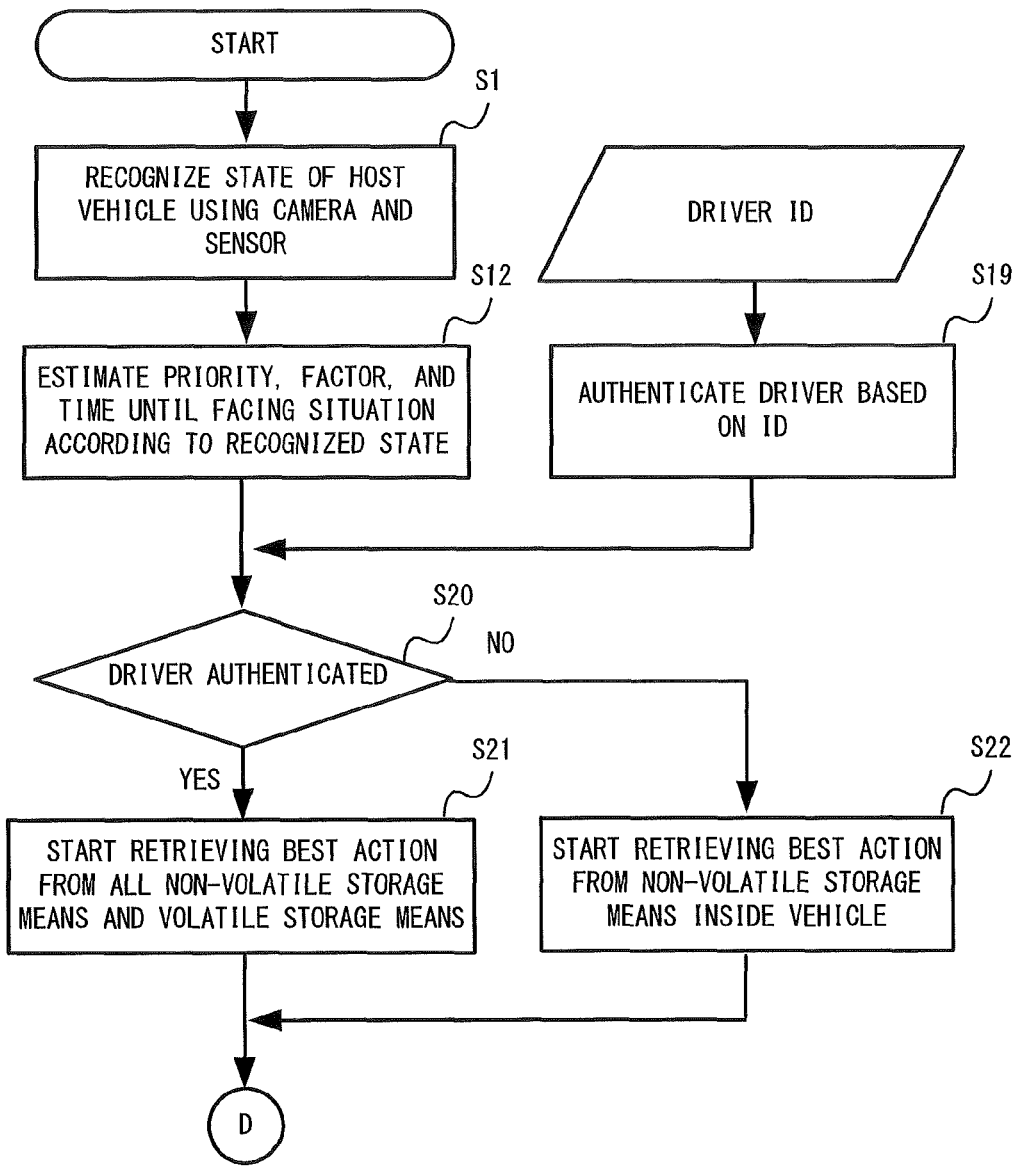
FIG. 17A is a flow chart showing an operation of the vehicle control system according to the fifth embodiment.
Figure 17B:
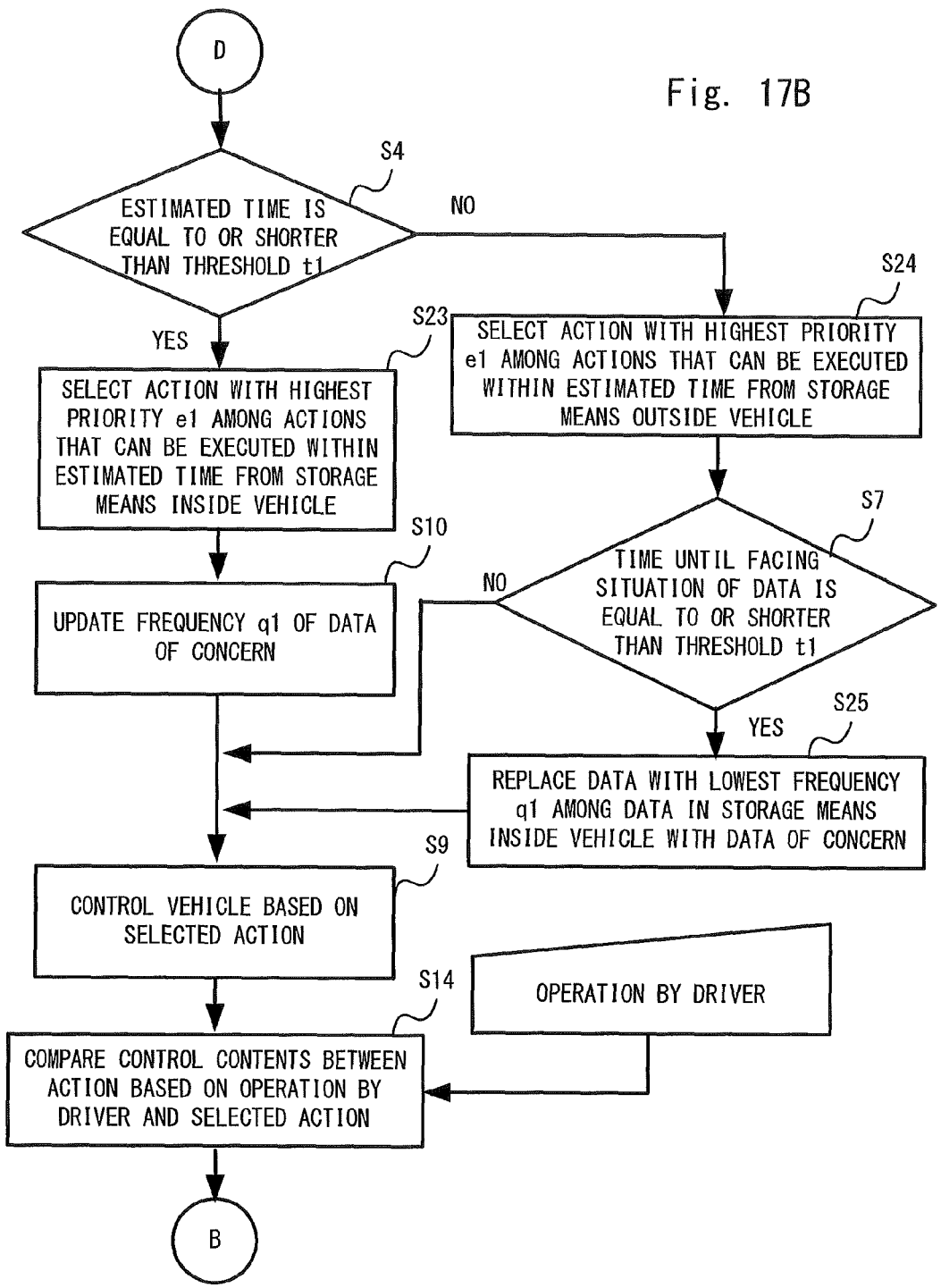
FIG. 17B is a flow chart showing an operation of the vehicle control system according to the fifth embodiment.
Figure 18:
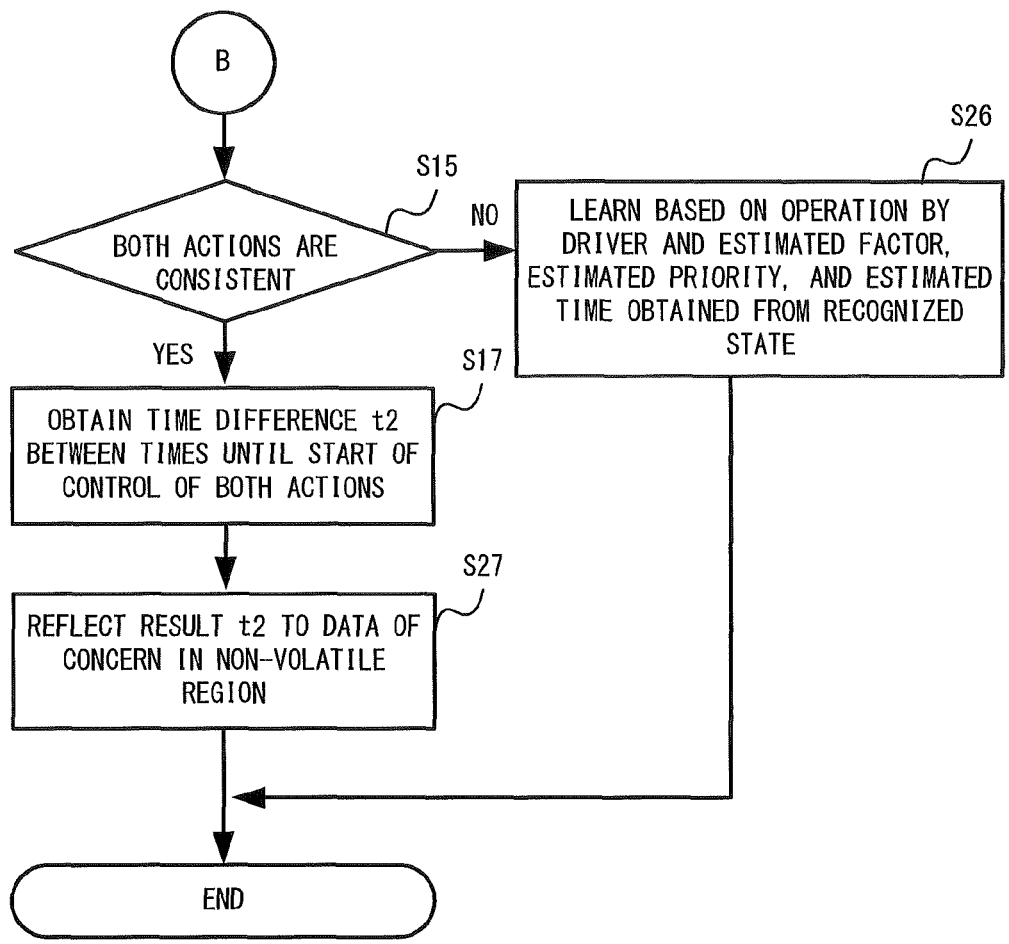
FIG. 18 is a flow chart showing an operation of the vehicle control system according to the fifth embodiment.
Figure 19:
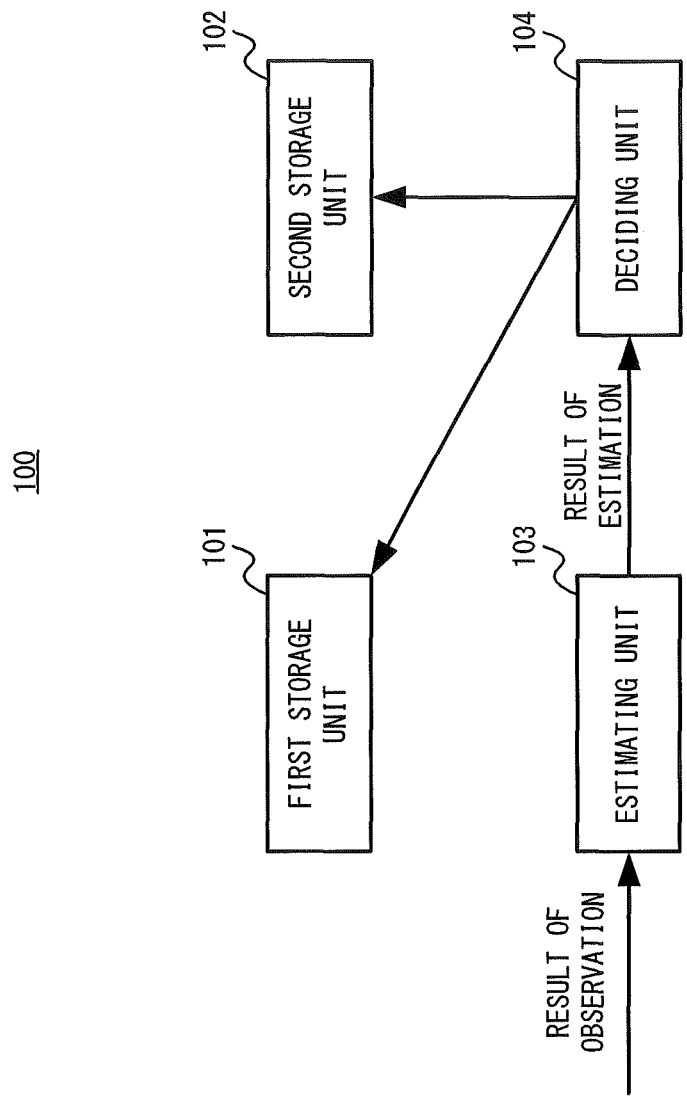
FIG. 19 is a configuration diagram of a control system according to a sixth embodiment.

The operation shown in FIGS. 17A, 17B and 18 differs from the operation shown in FIG. 12 in that the operation shown in FIGS. 17A, 17B and 18 further includes step S19. In addition, the operation shown in FIGS. 17A, 17B and 18 also differs from the operation shown in FIG. 12 in that the operation shown in FIGS. 17A, 17B and 18 includes steps S20 to S22 in place of step S3 following step S12. Furthermore, the operation shown in FIGS. 17A, 17B and 18 differs from the operation shown in FIG. 12 in that the operation shown in FIGS. 17A, 17B and 18 includes steps S23 to S27 in place of respective steps S5, S6, S11, S16, and S18.

In a similar manner to the description with reference to the first embodiment, the vehicle-mounted control system 1 according to the present fifth embodiment also selectively acquires several pieces of data among pluralities of pieces of data respectively stored in the non-volatile storage means 30 and the non-volatile storage means 32 from the data management system 3 and stores the acquired data in the volatile storage means 13 and the non-volatile storage means 17 in advance.

The action acquiring unit 52 acquires data to be stored in the non-volatile storage means 17 in an initial state from the non-volatile storage means 30 when ignition power supply of the host vehicle is switched on and power is supplied to the ECU 10 to make the ECU 10 operable. The action acquiring unit 52 stores the acquired data in the non-volatile storage means 17.

More specifically, when ignition power supply of the host vehicle is switched on and power is supplied to the ECU 10 to make the ECU 10 operable, the determination MCU 21 transmits request information for requesting transmission of data to be stored in the non-volatile storage means 17 in an initial state to the action information management server 40. In response to the request information from the determination MCU 21, the action information management server 40 transmits instruction information for instructing acquisition of data to be stored in the non-volatile storage means 17 in an initial state to the data server 41.

In accordance with the instruction information from the action information management server 40, the data server 41 acquires data to be stored in the non-volatile storage means 17 in an initial state from the non-volatile storage means 30 and transmits the acquired data to the action information management server 40. At this point, the data server 41 acquires at least one piece of data for each "factor". In addition, the data server 41 acquires as many pieces of data as can be stored in the non-volatile storage means 17 in an ascending order of a "time until facing situation" that is included in the data. The action information management server 40 transmits the data received from the data server 41 to the determination MCU 21. The determination MCU 21 stores the data received from the action information management server 40 in the non-volatile storage means 17.

In addition, when authentication of a driver is performed by the driver authenticating unit 58 and the driver becomes authenticated, the action acquiring unit 52 acquires data to be stored in the volatile storage means 13 in an initial state from the non-volatile storage means 32. The action acquiring unit 52 stores the acquired data in the volatile storage means 13. Moreover, driver authentication will be described later as step S19.

More specifically, when authentication of a driver is performed and the driver becomes authenticated, the determination MCU 21 transmits request information for requesting transmission of data to be stored in the volatile storage means 13 in an initial state to the action information management server 40. In response to the request information from the determination MCU 21, the action information management server 40 transmits instruction information for instructing acquisition of data to be stored in the volatile storage means 13 in an initial state to the data server 43.

In accordance with the instruction information from the action information management server 40, the data server 43 acquires data to be stored in the volatile storage means 13 in an initial state among data corresponding to the authenticated driver from the non-volatile storage means 32 and transmits the acquired data to the action information management server 40. At this point, the data server 43 acquires at least one piece of data for each "factor". In addition, the data server 43 acquires as many pieces of data as can be stored in the volatile storage means 13 in an ascending order of a "time until facing situation" that is included in the data. The action information management server 40 transmits the data received from the data server 43 to the determination MCU 21. The determination MCU 21 stores the data received from the action information management server 40 in the volatile storage means 13.

When authentication information is input by the driver via an input device, the driver authenticating unit 58 authenticates the driver based on the input authentication information (S19). More specifically, an input MCU (not shown) included in the vehicle-mounted control system 1 transmits the authentication information input to the input device to the determination MCU 21. The determination MCU 21 authenticates the driver based on authentication information input from the input MCU. When the authentication information matches the expected value, the determination MCU 21 sets a status that is recognized with respect to the driver to "authenticated". On the other hand, when the authentication information does not match the expected value, the determination MCU 21 maintains "unauthenticated" as the status that is recognized with respect to the driver. Moreover, the authentication of the driver may be performed by the action information management server 40 or the data server 43 by having the determination MCU 21 transmit authentication information to the action information management server 40 or the data server 43. In addition, an authentication result may be made recognizable by the determination MCU 21 by having the action information management server 40 or the data server 43 transmit notification information for notifying the authentication result to the determination MCU 21.

After estimation (S12) by the situation estimating unit 51, when the driver is authenticated (yes in S20), the action acquiring unit 52 starts retrieval of an action from all of the non-volatile storage means 17, 30, and 32 and the volatile storage means 13 (S21). On the other hand, when the driver is unauthenticated (no in S20), the action acquiring unit 52 starts retrieval of an action from the non-volatile storage means 17 and 30 which store action characteristic information of a vehicle (S22).

More specifically, when performing retrieval of action characteristic information from the volatile storage means 13 and the non-volatile storage means 17 inside the vehicle, the determination MCU 21 retrieves data with a "factor" matching the estimated factor from the volatile storage means 13 only when the driver is authenticated. Subsequently, the determination MCU 21 transmits the data acquired by the retrieval to the control MCUs 22 and 23. In addition, regardless of whether or not the driver is authenticated, the determination MCU 21 transmits request information for requesting data with a "factor" matching the estimated factor to be retrieved to the storage MCU 25. In response to the request information from the determination MCU 21, the storage MCU 25 retrieves data instructed by the request information from the non-volatile storage means 17. The storage MCU 25 transmits the data acquired by the retrieval to the control MCUs 22 and 23.

On the other hand, when performing retrieval of action characteristic information from the non-volatile storage means 30 and 32 outside of the vehicle, request information is transmitted to the action information management server 40. At this point, when the driver is authenticated, the request information that is transmitted to the action information management server 40 includes information indicating that both the non-volatile storage means 30 and the non-volatile storage means 32 are objects of retrieval. On the other hand, when the driver is unauthenticated, the request information that is transmitted to the action information management server 40 includes information indicating that only the non-volatile storage means 30 is an object of retrieval.

In response to request information from the determination MCU 21, instruction information for instructing the retrieval requested by the request information is transmitted to a data server corresponding to the non-volatile storage means specified in the request information among the data server 41 and the data server 43. Since subsequent operations are similar to the operations described in the first embodiment, a description thereof will be omitted. Accordingly, when the driver is authenticated, data retrieved from the non-volatile storage means 30 and 32 by the data server 41 and the data server 43 is transmitted to the control MCUs 22 and 23. On the other hand, when the driver is unauthenticated, only data retrieved from the non-volatile storage means 30 by the data server 41 is transmitted to the control MCUs 22 and 23.

When the estimated time calculated by the situation estimating unit 51 is equal to or shorter than the threshold t1 (yes in S4), the action acquiring unit 52 acquires action characteristic information corresponding to the estimated factor calculated by the situation estimating unit 51 from storage means inside the vehicle. The output control unit 53 selects an action which can be executed within a time until facing a situation as estimated by the situation estimating unit 51 and which has a highest priority e1 among actions indicated by the action characteristic information acquired from the storage means inside the vehicle by the action acquiring unit 52 (S23).

On the other hand, when the estimated time calculated by the situation estimating unit 51 is longer than the threshold t1 (no in S4), the action acquiring unit 52 acquires action characteristic information corresponding to the estimated factor calculated by the situation estimating unit 51 from storage means outside of the vehicle. The output control unit 53 selects an action which can be executed within a time until facing a situation as estimated by the situation estimating unit 51 and which has a highest priority e1 among actions indicated by the action characteristic information acquired from the storage means outside of the vehicle by the action acquiring unit 52 (S24).

More specifically, an operation is performed as follows when adopting a method equivalent to the first method described in the first embodiment. When the estimated time is equal to or shorter than the threshold t1, the determination MCU 21 performs the retrieval from the volatile storage means 13 and the transmission of request information to the storage MCU 25 described above and does not perform the transmission of request information to the action information management server 40 described above. On the other hand, when the estimated time is longer than the prescribed threshold t1, the determination MCU 21 does not perform the retrieval from the volatile storage means 13 and the transmission of request information to the storage MCU 25 described above but performs the transmission of request information to the action information management server 40 described above.

In addition, an operation is performed as follows when adopting a method equivalent to the second method described in the first embodiment. The determination MCU 21 performs the retrieval from the volatile storage means 13, the transmission of request information to the storage MCU 25, and the transmission of request information to the action information management server 40 as described above regardless of whether or not the estimated time is equal to or shorter than the threshold t1. Subsequently, when the estimated time is equal to or shorter than the threshold t1, the control MCUs 22 and 23 do not acquire action characteristic information included in the data received from the action information management server 40 as a candidate for action characteristic information to be selected and utilized to control the host vehicle but acquire action characteristic information included in the data received from the determination MCU 21 and the storage MCU 25 as a candidate for action characteristic information to be selected and utilized to control the host vehicle. On the other hand, when the estimated time is longer than the threshold t1, the control MCUs 22 and 23 do not acquire action characteristic information included in the data received from the determination MCU 21 and the storage MCU 25 as a candidate for action characteristic information to be selected and utilized to control the host vehicle but acquire action characteristic information included in the data received from the action information management server 40 as a candidate for action characteristic information to be selected and utilized to control the host vehicle.

An action is selected from the non-volatile storage means 30 and 32 outside of the vehicle (S24), and when a "time until facing situation" indicated by data including action characteristic information indicating the selected action is equal to or shorter than the threshold t1 (yes in S7), the action acquiring unit 52 replaces data with a lowest frequency among the pluralities of pieces of data stored in the volatile storage means 13 and the non-volatile storage means 17 inside the vehicle with data including the action characteristic information selected by the output control unit 53 (S25). At this point, when the data including the selected action characteristic information is data acquired from the non-volatile storage means 30 which stores action characteristic information of the vehicle, the action acquiring unit 52 retrieves data with a lowest frequency from both the volatile storage means 13 and the non-volatile storage means 17. On the other hand, when the data including the selected action characteristic information is data acquired from the non-volatile storage means 32 which stores action characteristic information of the driver, the action acquiring unit 52 retrieves data with a lowest frequency from only the volatile storage means 13. As briefly mentioned earlier, a reason therefor will be described later.

The operation in step S25 differs from step S8 according to the fourth embodiment in that not only data stored in the volatile storage means 13 but data stored in the non-volatile storage means 17 are also considered candidates for replacement. More specifically, as described earlier, the determination MCU 21 replaces data corresponding to frequency information indicating a lowest frequency among data stored in the volatile storage means 13 and the non-volatile storage means 17 with data transmitted from the control MCUs 22 and 23. Moreover, the determination MCU 21 may acquire frequency information stored in the non-volatile storage means 17 via the storage MCU 25. In a similar manner to the description given earlier, favorably, the determination MCU 21 decides data to be a replacement target so that at least data with a shortest "time until facing situation" is retained for each "factor".

When the action comparing unit 56 determines that the control contents are inconsistent (no in S15), the action learning unit 57 performs learning based on the action performed based on the operation by the driver and the priority and the time until facing the situation as estimated based on the recognized state (S26).

The operation of step S26 differs from step S16 according to the fourth embodiment in that, as described earlier, new data is to be added to both non-volatile storage means 30 and 32. More specifically, the action information management server 40 transmits instruction information for instructing addition of data to the data server 41 and the data server 43 in accordance with the request information from the determination MCU 21. Since other operations are similar to step S16, a description thereof will be omitted.

When the action comparing unit 56 determines that the control contents are consistent (yes in S15), the action learning unit 57 calculates a time difference t2 between reaction times (S17) and subsequently reflects the calculated time t2 onto data in the non-volatile storage means 32 (S26).

The operation of step S27 differs from step S18 according to the fourth embodiment in that, as described earlier, the calculated time t2 is only reflected in the non-volatile storage means 32 that stores action characteristic information of the driver. More specifically, the action information management server 40 transmits instruction information for instructing correction of data only to the data server 43 in accordance with the request information from the determination MCU 21.

As described above, in the present fifth embodiment, the non-volatile storage means 30 stores data of a vehicle that is shared by a plurality of drivers. The non-volatile storage means 17 can be accessed at a higher speed than the non-volatile storage means 30 and selectively stores data stored in the non-volatile storage means 30. The non-volatile storage means 32 stores data for each of a plurality of drivers. The volatile storage means 13 selectively stores data of authenticated drivers among the data stored in the non-volatile storage means 30.

In addition, when a required time until encountering an estimated factor is equal to or shorter than a threshold and when a driver is authenticated, the situation estimating unit 51 and the output control unit 53 decide control contents of a vehicle based on data stored in the non-volatile storage means 17 and data of the authenticated driver that is stored in the volatile storage means 13. Furthermore, when the estimated required time is equal to or shorter than a threshold and when a driver is unauthenticated, the situation estimating unit 51 and the output control unit 53 decide control contents of the vehicle based on data stored in the non-volatile storage means 17. In addition, when a required time until encountering an estimated factor is longer than a threshold and when a driver is authenticated, control contents of a vehicle are decided based on data stored in the non-volatile storage means 30 and data of the authenticated driver that is stored in the non-volatile storage means 32. Furthermore, when the estimated required time is longer than a threshold and when a driver is unauthenticated, control contents of a vehicle are decided based on data stored in the non-volatile storage means 30.

Accordingly, when the driver is not authenticated, control contents of the vehicle can be decided using only data of the vehicle. In addition, when the driver is authenticated, control contents of the vehicle can be decided using both data of the vehicle and data of the driver. In other words, optimal control of a vehicle in accordance with a combination of the vehicle and a driver can be performed. For example, optimal control of a vehicle can be performed even when the vehicle is driven by frequently changing drivers such as a bus, a delivery track, and a rental car.

Moreover, the data server 41 and the data server 43 can also be managed independently. For example, the data server 43 that manages action characteristic information of a driver can be managed by a delivery service operator, a bus operating company, or a rental car operating company, and the data server 41 that manages action characteristic information of a vehicle can be managed by a vehicle manufacturer.

In addition, in the present fifth embodiment, among the storage means 13 and 17 located inside a vehicle, volatile storage means is used as the storage means 13 that stores action characteristic information of a driver and non-volatile storage means is used as the storage means 17 that stores action characteristic information of a vehicle. Accordingly, even in a situation where the vehicle is unable to connect to a network, an action of the vehicle can be decided based on action characteristic information stored in the non-volatile storage means 17. In other words, when communication cannot be established with the data management system 3, the action acquiring unit 52 (the determination MCU 21) may acquire action characteristic information from the non-volatile storage means 17 regardless of whether or not a driver is authenticated and regardless of whether or not an estimated time is equal to or shorter than the threshold t1. In addition, as described above, action characteristic information stored in the non-volatile storage means 17 is solely acquired from the non-volatile storage means 30 that stores action characteristic information of a vehicle. Therefore, since action characteristic information of a vehicle does not change according to drivers as is the case of action characteristic information of a driver, problems do not arise even if a driver is replaced in a situation where the vehicle is unable to connect to a network.

Sixth Embodiment

Figure 20:
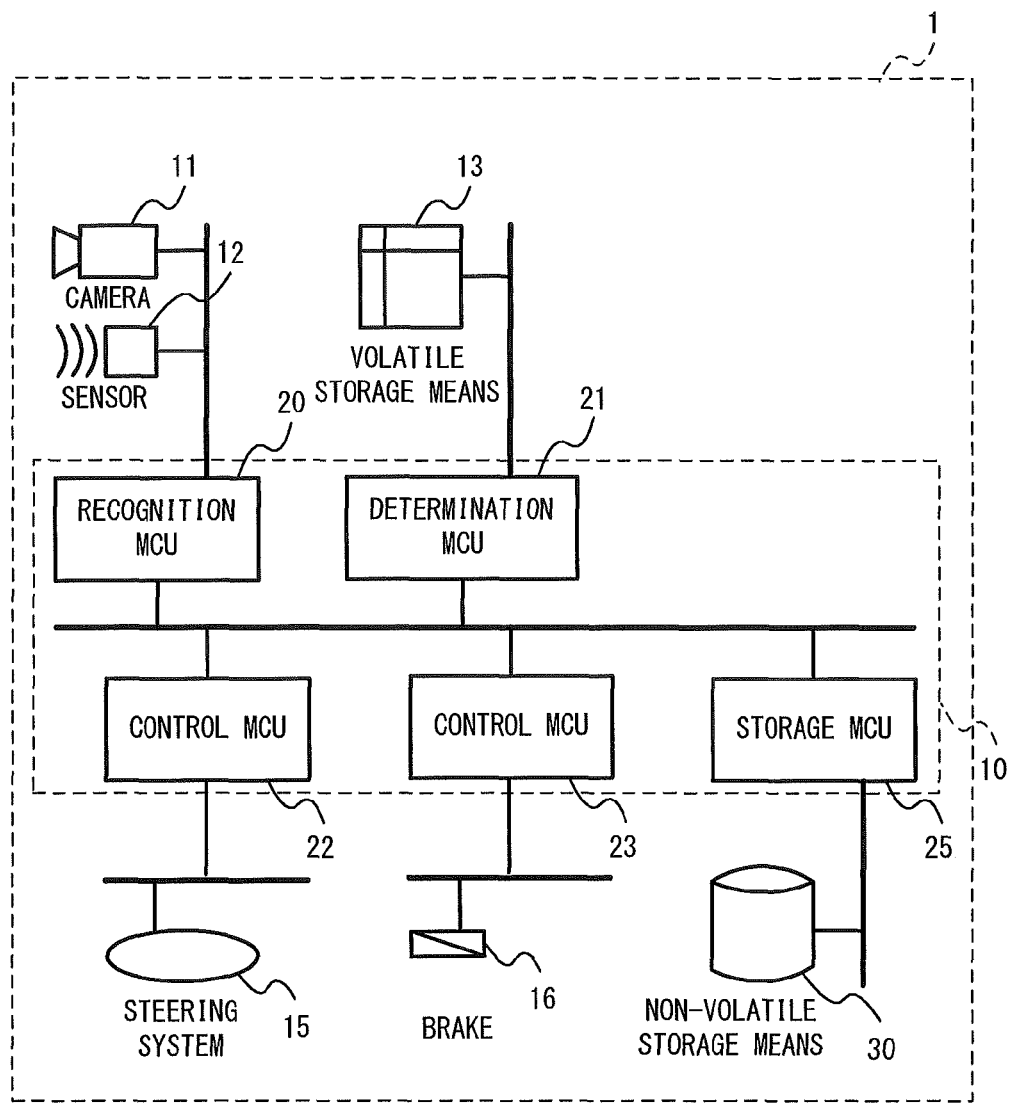
FIG. 20 is a configuration diagram of a vehicle-mounted control system according to another embodiment.

One embodiment extracted from the first to fifth embodiments described above will now be described as a sixth embodiment with reference to FIG. 20. As shown in FIG. 20, a control system 100 according to the sixth embodiment includes a first storage unit 101, a second storage unit 102, an estimating unit 103, and a deciding unit 104.

The first storage unit 101 stores a plurality of pieces of data which indicate, in association with each other, a factor that occurs with respect to a vehicle and control contents of the vehicle to be performed with respect to the factor. The second storage unit 102 enables access at a higher speed than the first storage unit 101 but stores a smaller number of pieces of data than the pieces of data stored in the first storage unit 101.

The estimating unit 103 estimates a factor and a required time until encountering the factor based on observation results of a periphery of the vehicle. The deciding unit 104 decides control contents of the vehicle based on the estimated factor and the data.

At this point, when the estimated required time is longer than a threshold, the deciding unit 104 decides control contents of the vehicle based on data stored in the first storage unit 101. On the other hand, when the estimated required time is equal to or shorter than a threshold, the deciding unit 104 decides control contents of the vehicle based on data stored in the second storage unit 102.

Accordingly, when the required time until encountering the factor is long, the action is selected based on data stored in the first storage unit 101. On the other hand, when the required time until encountering the factor is short and there is not sufficient time, the action is selected from the second storage unit 102 that enables access at a higher speed than the first storage unit 101. Therefore, the vehicle can be controlled with less delay in accordance with a factor that has occurred with respect to the vehicle.

While preferred embodiments of the present invention have been described using specific terms, it will be obvious to those skilled in the art that the invention is not limited to the described embodiments and that various changes and modifications may be made without departing from the spirit and the scope of the invention.

While examples in which the vehicle-mounted control system 1 includes only one camera 11 are described in the first to fifth embodiments presented above, the present invention is not limited thereto. A configuration may be adopted in which the vehicle-mounted control system 1 includes a plurality of cameras 11 and the recognition MCU 20 recognizes a state in which a host vehicle is in based on image information from the plurality of cameras 11. Accordingly, a recognition range may be expanded to a wider range instead of being limited to the front of the host vehicle. The same description applies to the sensor 12.

In addition, while examples in which the vehicle-mounted control system 1 includes control MCUs that respectively control each unit (a steering system, a brake, and the like) of an automobile so as to correspond to each unit of the automobile are described in the first to fifth embodiments presented above, the present invention is not limited thereto. In other words, one control MCU may be configured to control a plurality of control objects. For example, one control MCU, the steering system, and the brake may be connected to one another via a bus to have the control MCU control both the steering system and the brake.

Furthermore, in the third to fifth embodiments described above, a driver may be notified of a comparison result of control contents of a vehicle. For example, in accordance with notification information notifying a comparison result from the control MCUs 22 and 23, the determination MCU 21 may display an image representing the result on a display device (not shown) included in the vehicle-mounted control system 1. For example, the display device is a display panel such as a liquid crystal panel or an organic EL panel.

In addition, in the first to fifth embodiments presented above, when an estimated priority calculated based on a recognized state is low enough that data corresponding to the estimated priority does not exist, the determination MCU 21 may not perform retrieval of data. This is because a low estimated priority means that a degree to which an origin of a factor must be evaded is also low. For example, the determination MCU 21 may not perform retrieval of data when the estimated priority is equal to or lower than a prescribed threshold.

Furthermore, while an example in which the volatile storage means 13 and the non-volatile storage means 17 are included as storage means inside a vehicle is described in the fourth embodiment presented above, the present invention is not limited thereto. For example, the vehicle-mounted control system 1 may only include the volatile storage means 13. In this case, when a driver is unauthenticated, the determination MCU 21 may acquire data in an initial state from the non-volatile storage means 30 that stores action characteristic information of a vehicle and store the data in the volatile storage means 13. Therefore, when an estimated time is equal to or shorter than the threshold t1, the determination MCU 21 is to always perform retrieval of action characteristic information from the volatile storage means 13.

In addition, while examples in which the non-volatile storage means 30 that only allows access at a low speed by the ECU 10 is located outside of a vehicle (outside of the vehicle-mounted control system 1) are described in the first to fifth embodiments presented above, the present invention is not limited thereto. For example, if there is a difference in data access speeds between the volatile storage means 13 and the non-volatile storage means 30, both storage means may be located inside a vehicle.

For example, the vehicle-mounted control system 1 may be configured as shown in FIG. 20. The vehicle-mounted control system 1 shown in FIG. 20 differs from the vehicle-mounted control system 1 shown in FIG. 2 in that the vehicle-mounted control system 1 shown in FIG. 20 does not include the communication module 14 and the communication MCU 24 but further includes the storage MCU 25 and the non-volatile storage means 30.

In this case, when an estimated time is longer than the threshold t1, the determination MCU 21 transmits, to the storage MCU 25, request information for requesting data with a "factor" that is consistent with the estimated factor to be retrieved. In response to the request information, the storage MCU 25 retrieves data from the non-volatile storage means 30 and transmits the data to the control MCUs 22 and 23.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first to sixth embodiments can be combined as desirable by one of ordinary skill in the art.

What is claimed is:

1. A control system comprising:
    a first storage memory that stores a plurality of pieces of data indicating, in association with each other, a factor that occurs with respect to a vehicle and control contents of the vehicle to be performed with respect to the factor;
    a second storage memory that can be accessed at a higher speed than the first storage memory; and
    a processor executing program instructions and configured to provide:
        an estimating unit that estimates the factor and a required time until encountering the factor based on a result of an observation of a periphery of the vehicle; and
        a deciding unit that decides control contents of the vehicle based on the estimated factor and the data, to control the vehicle,
    wherein the first storage memory stores data which a required time until encountering the factor is longer than a threshold,
    wherein the second storage memory stores data which a required time until encountering the factor is equal to or shorter than the threshold,
    wherein when the estimated required time is longer than the threshold, the deciding unit decides control contents of the vehicle based on data stored in the first storage memory, and
    wherein when the estimated required time is equal to or shorter than the threshold, the deciding unit decides control contents of the vehicle based on data stored in the second storage memory.

2. The control system according to claim 1, wherein
    the second storage memory selectively stores data stored in the first storage memory, and when the deciding unit decides control contents of the vehicle based on the data stored in the first storage memory, the deciding unit replaces any of the data stored in the second storage memory with data indicating the decided control contents of the vehicle.

3. The control system according to claim 2, wherein
the data further indicates the required time assumed with respect to the factor, in association with the factor and the control contents of the vehicle,
the data indicates contents that can be executed before the required time lapses, as the control contents of the vehicle,
the second storage memory stores data indicating a required time that is equal to or shorter than the threshold, and
the deciding unit performs the replacement when data indicating the decided control contents of the vehicle indicates a required time that is equal to or shorter than the threshold.

4. The control system according to claim 2, wherein
the second storage memory stores, in association with the data, frequency information indicating a frequency at which control contents of the vehicle indicated by the data have been selected,
when the deciding unit decides control contents of the vehicle based on the data stored in the second storage memory, the deciding unit updates frequency information corresponding to the data indicating the decided control contents of the vehicle so as to indicate a higher frequency, and
when the deciding unit decides control contents of the vehicle based on the data stored in the first storage memory, the deciding unit preferentially replaces data corresponding to frequency information indicating a lower frequency.

5. The control system according to claim 1, wherein:
the data further indicates a priority which is set to increase as a degree by which the control contents of the vehicle evades the factor increases, in association with the factor and the control contents of the vehicle, and
the deciding unit preferentially selects control contents of the vehicle which correspond to a higher priority.

6. The control system according to claim 2, further comprising:
the processor configured to provide:
a comparing unit that compares the decided control contents of the vehicle and control contents of the vehicle based on an operation by a driver with respect to the factor; and
a learning unit that additionally stores data indicating, in association with each other, the factor and the control contents of the vehicle based on the operation by the driver with respect to the factor in the first storage memory, when the compared control contents of the vehicle are not consistent.

7. The control system according to claim 6, wherein:
the data further indicates, in association with the factor and the control contents of the vehicle, a priority of selecting the control contents of the vehicle,
the deciding unit preferentially selects control contents of the vehicle which correspond to a higher priority, and
the learning unit updates a priority of data indicating the decided control contents of the vehicle so as to lower the priority when the compared control contents of the vehicle are not consistent.

8. The control system according to claim 6, wherein:
the data further indicates, in association with the factor and the control contents of the vehicle, a result value regarding a result of a comparison between the control contents of the vehicle and control contents of the vehicle based on the operation by the driver,
the learning unit updates a result value in data indicating the decided control contents of the vehicle so as to lower the result value when the compared control contents of the vehicle are not consistent, and
the learning unit deletes data with a result value having fallen below a prescribed threshold from the first storage memory.

9. The control system according to claim 1, wherein:
the data further indicates, in association with the factor and the control contents of the vehicle, a reaction time from a point when the factor is estimated to a point when control according to the control contents of the vehicle is started, and
the control system further comprises:
the processor executing the program instructions and configured to provide:
a comparing unit that compares the decided control contents of the vehicle and control contents of the vehicle based on an operation by a driver with respect to the factor;
a measuring unit that measures the reaction time of the operation by the driver; and
a learning unit that corrects the reaction time in the data indicating the decided control contents of the vehicle so that the reaction time approaches the measured reaction time when the compared control contents of the vehicle are consistent.

10. The control system according to claim 2, further comprising:
wherein the processor is configured to provide an authenticating unit that authenticates drivers;
a third storage memory that stores, for each of a plurality of drivers, a plurality of pieces of data which indicate the factor and control contents of the vehicle in association with each other; and
a fourth storage memory that can be accessed at a higher speed than the third storage memory, and that selectively stores data stored in the third storage memory and corresponding to a driver authenticated by the authenticating unit, the number of pieces of data selectively stored in the fourth storage memory being smaller than the number of pieces of data stored in the third storage memory, wherein
the data stored in the first storage memory and the second storage memory is shared by the plurality of drivers,
when the estimated required time is equal to or shorter than a threshold and when the driver is authenticated, the deciding unit decides control contents of the vehicle based on the data stored in the second storage memory and the data of the authenticated driver stored in the third storage memory,
when the estimated required time is equal to or shorter than the threshold and when the driver is unauthenticated, the deciding unit decides control contents of the vehicle based on the data stored in the second storage memory,
when the estimated required time is longer than the threshold and when the driver is authenticated, the deciding unit decides control contents of the vehicle based on the data stored in the first storage memory and the data of the authenticated driver stored in the third storage memory, and when the estimated required time is longer than the threshold and when the driver is unauthenticated, the deciding unit decides control contents of the vehicle based on the data stored in the first storage memory.

11. The control system according to claim 10, wherein the second storage memory is volatile,
the first storage memory, the third storage memory, and the fourth storage memory are non-volatile,
the control system comprises a first system that is provided in the vehicle, and a second system that is connected to the first system via a network,
the first system includes the second storage memory, the fourth storage memory t, the estimating unit, the deciding unit, and the authenticating unit, and
the second system includes the first storage memory and the third storage memory.

12. The control system according to claim 10, wherein
the data further indicates, in association with the factor and the control contents of the vehicle, a reaction time from a point when the factor is estimated to a point when control according to the control contents of the vehicle is started,
the control system further comprises:
the processor executing the program instructions and configured to provide:
a comparing unit that compares the decided control contents and control contents of the vehicle based on an operation by a driver with respect to the factor;
a measuring unit that measures the reaction time of the operation by the driver; and
a learning unit that corrects a reaction time in data indicating the decided control contents so that the reaction time approaches the measured reaction time when the compared control contents are consistent, and that additionally stores data indicating, in association with each other, the factor and control contents of the vehicle based on the operation by the driver with respect to the factor in the first storage memory and the third storage memory when the compared control contents of the vehicle are not consistent, and
the learning unit corrects the reaction time when the data indicating the decided control contents is the data stored in the first storage memory, and does not correct the reaction time when the data indicating the decided control contents is the data stored in the third storage memory.

13. A semiconductor device comprising:
a processor executing program instructions stored in a non-transitory computer readable medium, and configured to provide:
an estimating unit that estimates, based on a result of an observation of a periphery of a vehicle, a factor which occurs with respect to the vehicle and a required time until encountering the factor; and
a presenting unit that acquires control contents based on the estimated factor from a first storage memory which stores a plurality of pieces of data indicating, in association with each other, the factor and control contents of the vehicle to be performed with respect to the factor, and a second storage memory which can be accessed at a higher speed than the first storage memory, and that presents the acquired control contents as a candidate of control contents of the vehicle to another semiconductor device that controls the vehicle, wherein
the presenting unit:
acquires the control contents from the first storage memory and presents the acquired control contents to the other semiconductor device when the estimated required time is longer than a threshold; and
acquires the control contents from the second storage memory and presents the acquired control contents to the other semiconductor device when the estimated required time is equal to or shorter than the threshold, to control the vehicle,
wherein the first storage memory stores data which a required time until encountering the factor is longer than the threshold, and
wherein the second storage memory stores data which a required time until encountering the factor is equal to or shorter than the threshold.

14. A semiconductor device comprising:
a processor that acquires control contents based on a factor which occurs with respect to a vehicle and that decides control contents of the vehicle, from a first storage memory which stores a plurality of pieces of data indicating, in association with each other, a factor that occurs with respect to the vehicle and control contents of the vehicle to be performed with respect to the factor, and from a second storage memory which can be accessed at a higher speed than the first storage memory, wherein
the processor:
decides the control contents of the vehicle from the control contents acquired from the first storage memory when a required time until encountering the factor as acquired from another semiconductor device is longer than a threshold; and
decides the control contents of the vehicle from the control contents acquired from the second storage memory when the required time is equal to or shorter than the threshold to control the vehicle,
wherein the first storage memory stores data which a required time until encountering the factor is longer than the threshold, and
wherein the second storage memory stores data which a required time until encountering the factor is equal to or shorter than the threshold.

15. The control system according to claim 1, wherein when the estimated required time is equal to or shorter than the threshold, the deciding unit decides control contents of the vehicle based on the data that is written and stored only in the second storage memory.

16. The control system according to claim 1, wherein the control contents of the vehicle is decided based on data read from a selection of either the first storage memory or the second storage memory to avoid delay.

17. The control system according to claim 1, when the estimated required time is longer than a threshold, the deciding unit decides control contents of the vehicle based on data stored in the first storage memory without accessing the second storage memory.

18. The semiconductor device according to claim 13, when the estimated required time is equal to or shorter than the threshold, the presenting unit decides control contents of the vehicle based on data stored in the second storage memory without accessing the first storage memory.

19. The semiconductor device according to claim 14, when the estimated required time is equal to or shorter than the threshold, the processor decides the control contents of the vehicle based on data stored in the second storage memory without accessing the first storage memory.

20. The semiconductor device according to claim 1, wherein the processor comprises an electronic control unit,
   wherein the second storage memory stores a smaller number of pieces of data than the number of pieces of data stored in the first storage memory, and
   wherein the deciding unit outputs to the vehicle to control the vehicle.

21. A method of a semiconductor device, the method comprising:
   storing in a first storage memory, a plurality of pieces of data indicating, in association with each other, a factor that occurs with respect to a vehicle and control contents of the vehicle to be performed with respect to the factor,
   wherein a second storage memory can be accessed at a higher speed than the first storage memory; and
   estimating, by an estimating unit, the factor and a required time until encountering the factor based on a result of an observation of a periphery of the vehicle; and
   deciding, by a deciding unit, control contents of the vehicle based on the estimated factor and the data, to control the vehicle,
   wherein the first storage memory stores data which a required time until encountering the factor is longer than a threshold,
   wherein the second storage memory stores data which a required time until encountering the factor is equal to or shorter than the threshold,
   wherein when the estimated required time is longer than the threshold, the deciding unit decides control contents of the vehicle based on data stored in the first storage memory, and
   wherein when the estimated required time is equal to or shorter than the threshold, the deciding unit decides control contents of the vehicle based on data stored in the second storage memory.

22. The method according to claim 21, wherein the second storage memory stores a smaller number of pieces of data than the number of pieces of data stored in the first storage memory,
   wherein the second storage memory selectively stores data stored in the first storage memory, and
   wherein when the deciding unit decides control contents of the vehicle based on the data stored in the first storage memory, the deciding unit replaces any of the data stored in the second storage memory with data indicating the decided control contents of the vehicle.

23. A program product stored in a computer readable medium, including instructions executable by a processor according to the method according to claim 21,
   wherein the processor comprises an electronic control unit, and
   wherein the deciding unit outputs to control the vehicle.

* * * * *